United States Patent [19]

Murakami et al.

[11] Patent Number: 4,863,995
[45] Date of Patent: Sep. 5, 1989

[54] PROPYLENE POLYMER COMPOSITION

[75] Inventors: Hirobumi Murakami; Tsutomu Suda; Mitunobu Machida; Hide Umemura, all of Kanagawa, Japan

[73] Assignee: Showa Denko Kabushiki Kaisha, Japan

[21] Appl. No.: 219,118

[22] Filed: Jul. 15, 1988

[30] Foreign Application Priority Data

Jul. 16, 1987 [JP] Japan .................................. 62-176022
Jul. 24, 1987 [JP] Japan .................................. 62-183600
Jul. 31, 1987 [JP] Japan .................................. 62-190287
Aug. 14, 1987 [JP] Japan .................................. 62-201852
Aug. 17, 1987 [JP] Japan .................................. 62-203014
Sep. 17, 1987 [JP] Japan .................................. 62-231171

[51] Int. Cl.$^4$ ...................... C08L 23/10; C08L 23/26; C08L 51/06
[52] U.S. Cl. ...................................... 525/74; 525/208; 525/71; 525/79; 525/207
[58] Field of Search ....................... 525/79, 208, 71, 74

[56] References Cited

U.S. PATENT DOCUMENTS 4,735,988  4/1988  Takada et al. ...................... 524/504
4,735,992  4/1988  Nogues ................................ 525/79
4,758,629  7/1988  Deyrup ............................... 525/208

Primary Examiner—Carman J. Seccuro
Attorney, Agent, or Firm—Sughrue, Mion, Zinn, Macpeak & Seas

[57] ABSTRACT

A propylene polymer composition is disclosed which comprises:
(a) a crystalline propylene polymer having a melt-flow index of from 0.01 to 100 g/10 min.;
(b) a first ethylene copolymer comprising ethylene and from about 3.0 to 50% by weight of at least one copolymerizable monomer selected from a vinyl ester and an unsaturated carboxylic acid ester; and at least one of
(c) a first modified propylene polymer produced by reacting 100 parts by weight of a propylene polymer with from about 0.01 to 10 parts by weight of an organic unsaturated compound having at least one hydroxyl group and from about 0.01 to 10 parts by weight of an organic peroxide, and
(d) a second ethylene copolymer comprising ethylene and at least one copolymerizable ethylenically unsaturated monomer having at least one epoxy group.

The composition has excellent adhesion to two-component system polychloroprene type adhesives and two-component system chlorinated polypropylene adhesives.

39 Claims, No Drawings

PROPYLENE POLYMER COMPOSITION

FIELD OF THE INVENTION

The present invention relates to a propylene polymer composition excellent in adhesion to two-component system polychloroprene adhesives or two-component system chlorinated polypropylene adhesives without using primers. More specifically, the invention relates to a propylene polymers composition excellent in adhesion properties to two-component system polychloroprene adhesives or two-component system chlorinated polypropylene type adhesives without using primers, as well as having satisfactory mechanical characteristics such as rigidity and impact resistance.

BACKGROUND OF THE INVENTION

As is well-known, since propylene polymers are excellent in moldability, as well as having satisfactory characteristics such as mechanical properties, heat resistance, solvent resistance, oil resistance and chemical resistance, they have generally been produced industrially and utilized in various fields such as parts for automobiles, electrical and electronic instruments, as well as daily necessities. However, since they have no polar groups in the molecules (i.e., "non-polarity") and are extremely poorly soluble in most organic solvents, they are extremely poor in adhesion properties with various adhesives (adhesive materials). Consequently, they have various disadvantages, as is illustrated by door linings interior materials for automobiles.

Door linings are usually made of polyvinyl chloride leathers, which are laminated with polypropylene foam, polyethylene foam, polyurethane foam, etc. However, since the polyvinyl chloride leathers are poor in rigidity, they can not be used as they are, but are bonded by means of adhesives with molding products of acrylonitrile-butadiene-styrene terpolymer resin (ABS resin) or resin boards of polypropylene blended with filler such as wood powder as a substance for increasing the rigidity of the lining material.

However, with the recent trend of the reduction of weight and cost in automobiles, polypropylene resins (propylene polymers), which are inexpensive and have satisfactory moldability, have been used increasingly in place of the ABS resin or the filler-containing polypropylene resin.

However, since the propylene polymers have no polar groups in the molecule and are high molecular materials that are extremely inert chemically, polyvinyl chloride leathers are actually bonded by means of adhesives coated to molding products (door liner substances) after previously applying a primer bondable with the propylene polymer or after applying a pre-treatment such as plasma treatment, corona discharge treatment and UV-ray irradiation. Accordingly, production is time consuming and increases the cost.

Upon preparing linings of other automobile interior materials, for example, instrument panels, pillars, ceiling materials, armrests, etc., there are similar problems when using propylene polymer and bonding polyvinyl chloride leather.

Recently, U.S. Pat. No.4,735,988 has disclosed that a propylene polymer composition containing a modified propylene polymer treated wth an organic compound having unsaturated bonds and hydroxyl groups and an organic peroxide has satisfactory adhesion to polyurethane without using a primer. However, the bondability of the propylene polymer composition with two-component system polychloroprene adhesives or two-component system chlorinated polypropylene adhesives is insufficient and there are keenly been demanded a propylene polymer composition showing improved adhesion with these adhesives even without using a primer.

SUMMARY OF THE INVENTION

An object of the present invention is to provide a propylene polymer composition having satisfactory adhesion to adhesives without requiring complicated pre-treatment procedures, as well as excellent moldability, mechanical properties (for example, impact resistance, rigidity, etc.) and also excellent appearance of the molded product.

It has now been found that these and other objects of the present invention are attained by a propylene polymer composition comprising:
  (a) a crystalline propylene polymer having a melt-flow index of from 0.01 to 100 g/10 min.;
  (b) a first ethylene copolymer comprising ethylene and from about 3.0 to 50% by weight of at least one copolymerizable monomer selected from a vinyl ester and an unsaturated carboxylic acid ester; and at least one of
  (c) a first modified propylene polymer produced by reacting 100 parts by weight of a propylene polymer with from about 0.01 to 10 parts by weight of an organic unsaturated compound having at least one hydroxyl group and from about 0.01 to 10 parts by weight of an organic peroxide, and
  (d) a second ethylene copolymer comprising comprising ethylene and at least one copolymerizable ethylenically unsaturated monomer having at least one epoxy group.

DETAILED DESCRIPTION OF THE INVENTION

(A) Crystalline Propylene Polymer

The crystalline propylene polymer used in the present invention is a polymer containing propylene as the main ingredient, and propylene homopolymer, as well as random and block copolymers of propylene and ethylene and/or other α-olefinic comonomers are preferably used. The total amount of ethylene and α-olefin comonomers in the random or block copolymer is about 30% by weight at the greatest, preferably not more than about 25% by weight, and particularly not more than about 22% by weight. Suitable α-olefin comonomers are those α-olefins with 4 to 12 carbon atoms, particularly with 4 to 8 carbon atoms, and preferred examples include butene-1, heptene-1, 4-methylpentene-1 and hexene-1.

The melt-flow index of the propylene polymer is from about 0.01 to 100 g/10 min., preferably from about 0.01 to 80 g/10 min., more preferably from about 0.05 to 70 g/10 min., and most preferably from about 0.2 to 70 g/10 min., when measured under Condition L according to ASTM D1238. The melt-flow index measured under this condition is referred to as "MFR (1)".

If a propylene polymer with an MFR (1) of less than about 0.01 g/10 min. is used, the moldability is poor. On the other hand, if a propylene polymer with an MFR (1) in excess of about 100 g/10 min. is used, the impact resistance of the composition is not satisfactory.

(B) First Ethylene Copolymer

The first ethylene copolymer is used in the present invention (hereafter referred to as "ethylene copolymer (I)") is a copolymer of ethylene with at least one of a vinyl ester and an unsaturated carboxylic acid ester described later, and can be a multi-ingredient copolymer containing them as the main ingredient and other comonomers. The total amount of the vinyl ester and unsaturated carboxylic acid ester in ethylene copolymer (I) is from about 3.0 to 50% by weight, preferably from about 4.0 to 45% by weight, more preferably, from about 5.0 to 40% by weight, and most preferably from about 7.0 to 40% by weight. Use of an ethylene copolymer with an amount of the vinyl ester and/or unsaturated carboxylic acid ester less than about 3.0% by weight is not desired since the improvement is not satisfactory. On the other hand, use of the ethylene copolymer (I) containing the vinyl ester and/or unsaturated carboxylic acid ester in an amount in excess of about 50% by weight is not preferred, since the physical properties of the composition are reduced and the molded product obtained therefrom causes delamination (i.e., peeling of a skin layer from the injection molded product). The melt flow index of the ethylene copolymer (I) (measured under Condition E according to ASTM D1238; hereinafter referred to as "MFR (2)") is usually from about 0.01 to 300 g/10 min., preferably from about 0.1 to 200 g/10 min., more preferably from about 0.5 to 150 g/10 min., and most preferably from about 0.5 to 100 g/10 min. If an ethylene copolymer (I) with an MFR (2) of less than about 0.01 g/10 min. is used, the moldability is poor. On the other hand, if an ethylene copolymer (I) with an MFR (2) in excess of about 300 g/10 min. is used, the mechanical strength of the composition is poor.

As the vinyl ester, those with up to 20, preferably 4 to 16 carbon atoms are preferred. Suitable vinyl esters include, for example, vinyl acetate, vinyl propionate, vinyl butyrate and vinyl pivalate, with vinyl acetate being most preferred.

The unsaturated carboxylic acid esters contain from 4 to 40 carbon atoms, preferably from 4 to 30 carbon atoms, and particularly preferably from 4 to 20 carbon atoms. Typical examples of the unsaturated carboxylic acid ester include methyl (meth)acrylate, ethyl (meth)acrylate and alkoxyalkyl acrylate. Those alkoxyalkyl acrylates having an alkoxy group with 1 to 8, preferably 1 to 4 carbon atoms, and an alkyl group having from 1 to 8, preferably from 1 to 4 carbon atoms are preferred. Typical examples of preferred alkoxyalkyl acrylates include methoxyethyl acrylate, ethoxymethyl acrylate and butoxyethyl acrylate.

(C) First Modified Propylene Polymer

The first modified propylene polymer (I) used in the present invention (hereafter referred to as "modified propylene polymer (1)") is obtained by treating the propylene polymer described later with a hydroxyl compound and an organic peroxide and optionally an organotin compound, and a production process therefor is detailed in the specification of JP-A-58-154732 (the term "JP-A" as used herein refers to a "published unexamined Japanese patent application").

(1) Propylene polymer

The propylene polymer to be modified can include a propylene homopolymer, random or block copolymer of ethylene and propylene, and a random or block polymer with other α-olefins with a carbon atom number of up to 12. the copolymerization ratio of the α-olefin is about 20% by weight at the greatest. The MFR (1) of the propylene (co)polymer is usually from about 0.01 to 100 g/10 min., preferably from about 0.01 to 50 g/10 min., more preferably from about 0.02 to 50 g/10 min., most preferably from about 0.02 to 40 g/ 10 min., in view of the moldability and the mechanical properties of the obtained composition.

(2) Hydroxyl compound

The hydroxyl compound is a compound having at least one unsaturated bond (double bond, triple bond) and containing a hydroxyl group. Typical examples are alcohols having double bond; alcohols having triple bond; esters of a mono- or di-basic unsaturated carboxylic acid with an unsubstituted dihydric alcohol; and esters of the above-mentioned unsaturated carboxylic acid with an unsubstituted trihydric alcohol, with an unsubstituted tetrahydric alcohol or with an unsubstituted penta- or higher hydric alcohol. Typical examples of such hydroxyl compounds are 2-hydroxyethyl (meth)alcrylate, 2-hydroxypropyl (meth)acrylate, 2-hydroxybutyl (meth)acrylate, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, cis-1,4-dihydroxy-2-butene, trans-1,4-dihydroxy-2-butene, 3-hydroxypropyl (meth)acrylate, 2-hydroxyethyl crotonate, 2,3,4,5,6-pentahydroxyhexyl (meth)acrylate, and 2,3,4,5-tetrahydroxypentyl (meth)acrylate.

(3) Organic Peroxide

The organic peroxide may include those generally used as the initiator in radical polymerization and the crosslinking agent of a polymer, preferably one having a temperature for a half-life period of one minute of 100° C. or higher, most preferably 130° C. or higher. If the above temperature is lower than 100° C., not only is handling of the peroxide difficult, but also an appreciable effect of this use cannot be recognized. Typical examples of such organic peroxide are ketone peroxides such as 1,1-bis-tert-butyl-peroxy-3,3,5-trimethylcyclohexane, dialkyl peroxides such as dicumyl peroxide, hydroperoxides such as 2,5-dimethylhexane-2,5-hydroperoxide, diacyl peroxides such as benzoyl peroxide, and peroxy esters such as 2,5-dimethyl-2,5dibenzoyl peroxyhexane.

(4) Organotin Compound

The organotin compound which is optionally but preferably used in the preparation of the modified propylene polymer (I) is a compound represented by the following formula (I)

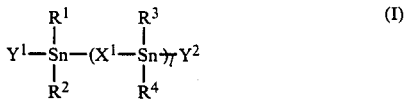

wherein $R^1$, $R^2$, $R^3$ and $R^4$, which may be the same or different, each represents a hydrocarbon group having 1 to 12 carbon atoms, $Y^1$ and $Y^2$, which may be the same or different, each represents a mono- or dibasic carboxylic acid group having up to 18 carbon atoms and derivative thereof (such as alkyl esters), an alcohol group, a mercaptan group, or a mercapto acid group, $X^1$ represents an oxygen atom, a sulfur atom, or a carboxylic acid group having at most 4 carbon atoms and having a double bond, and l is 0 or an integer of from 1 to 20.

Typical examples of the organotin compound include monobutyltin trimethyl maleate, dibutyltin dilaurate, a mixture of dibutyltin dimaleate and dibutyltin dimethyl maleate, dibutyltin dioctyl maleate, and tribenzyltin trimethyl maleate.

(5) Mixing ratio

The mixing ratio of the hydroxyl compound per 100 parts by weight of the propylene copolymer for preparing the modified propylene polymer (1) of the present invention is from about 0.01 to 10 parts by weight, preferably from about 0.02 to 10 parts by weight, more preferably from about 0.02 to 7.0 parts by weight, and most preferably from about 0.1 to 7.0 parts by weight. If the mixing ratio of the hydroxyl compound is less than about 0.01 part by weight per 100 parts by weight of the propylene polymer, the effect for improving adhesion is insufficient. On the other hand, use of the compound in excess of about 10 parts of weight is not preferred since the improvement of adhesion does not correspond to the increasing amount used, and the properties of the propylene polymer are rather degraded.

The mixing ratio of the organic peroxide per 100 parts by weight of the propylene polymer is from about 0.01 to 10 parts by weight, preferably from about 0.01 to 7.0 parts by weight, more preferably from about 0.02 to 5.0 parts by weight, and most preferably from about 0.05 to 5.0 parts by weight. If the mixing ratio of the organic peroxide based on 100 parts by weight of the propylene polymer is less than about 0.01 part by weight, adhesion is not improved and the endurance of the bonding strength of the mixture is also lowered. On the other hand, if the mixing ratio exceeds about 10 parts by weight, the excellent mechanical properties of the polymer are reduced.

The mixing ratio of the organotin compound per 100 parts by weight of the propylene polymer is from 0 to about 10 parts by weight, preferably from about 0.01 to 5 parts by weight, and more preferably from about 0.01 to 3 parts by weight. Use of more than 10 parts by weight of the organotin compound often results in adverse influence such as bleeding.

(6) Production method for modified propylene polymer (1)

The modified propylene polymer (1) according to the present invention can be produced by heating the propylene polymer, the hydoxyl compound and the organic peroxide, with or without the organotin compound, in the above-mentioned mixing ratio. In this case, the propylene polymer, the hydroxyl compound and the organic peroxide (and the organotin compound) may be mixed in the course of the treatment, or these ingredients may be previously mixed in a dry blend or they may be kneaded at a ralatively low temperature at which the hydroxyl compound does not react and the thus-obtained mixture may be heated as described later.

If the processing is conducted at a high temperature, the propylene polymer may be degraded. However, the processing has to be carried out at a temperature sufficient to decompose the organic peroxide used for the graft polymerization of the propylene polymer and the hydroxyl compound. In view of the above, the processing is generally at a temperature from about 180° to 300° C., preferably from about 180° to 280° C., more preferably from about 180° to 250° C., though those temperatures may vary depending on the type of the organic peroxide used.

General formula, typical examples, as well as the mixing method and the processing method for the hydroxyl compound and the organic peroxide as described above are detailed in the specification of JP-A-58-154732.

(D) Second Ethylene Polymer

The second ethylene polymer used in the present invention (hereafter referred to as "ethylene polymer (II)") is a copolymer containing ethylene and at least one ethylenically unsaturated comonomer containing an epoxy group (hereafter referred to as "epoxy compound"). The copolymer may also be a multi-ingredient copolymer also containing other copolymerizable monomers.

Typical examples of the epoxy compound include those represented by formulae (II) and (III):

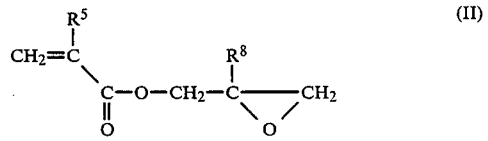

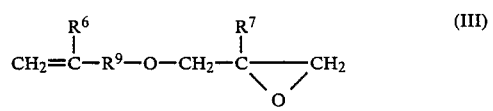

where $R^5$, $R^6$, $R^7$ and $R^8$, which may be the same or different, each represents hydrogen or methyl, and $R^9$ represents a linear or branched alkylene group of 1 to 12 carbon atoms.

Typical examples of the epoxy compound represented by formulae (II) and (III) include glycidyl methacrylate, glycidyl acrylate, α-methylglycidyl acrylate, α-methylglycidyl methacrylate, vinyl glycidyl ether, allyl glycidyl ether and methacryl glycidyl ether.

Further, the ethylene polymer (II) may contain at least one of the following unsaturated carboxylic acid esters and vinyl esters as a third comonomer.

Those unsaturated carboxylic acid esters having from 4 to 40 carbon atoms and particularly from 4 to 20 carbon atoms are preferred. Typical examples of the unsaturated carboxylic acid ester include methyl (meth)acrylate, ethyl (meth)acrylate and alkoxyalkyl acrylate. Those alkoxyalkyl acrylates in which the alkoxy group has from 1 to 8 and preferably from 1 to 4 carbon atoms, and the alkyl group has from 1 to 8 and preferably from 1 to 4 carbon atoms, are preferred. Typical examples of preferred alkoxyalkyl acrylates include methoxyethyl acrylate, ethoxyethyl acrylate and butoxyethyl acrylate.

Those vinyl esters having up to 20 carbon atoms and particularly 4 to 16 carbon atoms are preferred. Typical examples include vinyl acetate, vinyl propionate, vinyl butyrate and vinyl pivalate.

The amount of the epoxy compound in the ethylene copolymer (II) is usually from about 0.1 to 20% by weight, preferably from about 0.5 to 20% by weight, and particularly preferably from about 0.5 to 15% by weight. Further, in the case of the multi-ingredient copolymer, the third ingredient is generally present in an amount up to about 69.9% by weight, preferably not more than about 65% by weight, and particularly preferably not more than about 60% by weight.

Both the ethylene copolymer (I) and the ethylene (II) can be prepared by copolymerizing ethylene and co-polymerizable comonomers (including the third ingredient) under a high pressure, e.g., from 50 to 2500 kg/cm$^3$ at a temperature of 120° to 260° C., in the presence of a chain transfer agent, for example, an organic peroxide. The copolymerization method are well-known.

Those ethylene copolymers (II) with an MFR (2) of generally from about 0.01 to 1000 g/10 min., preferably from about 0.05 to 500 g/10 min., more preferably from about 0.1 to 500 g/10 min., are preferred. If an ethylene copolymer (II) with an MFR (2) of less than about 0.01 g/10 min. is used, it is difficult to uniformly mix upon preparing the mixture of the present invention and the moldability is not satisfactory as well. On the other hand, if the ethylene copolymer (II) with an MFR (2) in excess of about 1000 g/10 min. is used, the mechanical strength of the composition is poor.

The rigidity of the composition can further be improved by blending a filler with the propylene polymer composition according to the present invention.

(E) Filler

The filler used in the present invention is generally employed broadly in the field of synthetic resins and rubbers. Among the fillers, inorganic compounds not reactive with oxygen and water and those not decomposed upon kneading and molding are preferably used as the inorganic filler. The inorganic filler can include, for example, oxides of metals such as aluminium, copper, iron, lead, nickel, magnesium, calcium, barium, zinc, zirconium, molybdenum, silicon, antimony and titanium, as well as hydrates, (hydroxides), sulfates, carbonates, silicates, complex salts and mixtures thereof. Typical examples of the inorganic fillers are described in U.S. patent application Ser. No. 694,193 filed January 23, 1985, such as aluminum oxide (alumina), their hydrates, calcium oxide, magnesium oxide (magnesia), magnesium hydroxide, zinc oxide, oxides of lead such as lead monoxide and red lead, magnesium carbonate, calcium carbonate, basic magnesium carbonate, white carbon, asbestos, mica, talc, glass fiber, glass powder, glass beads, clay, diatomaceous earth (kaolin clay), silica, wollastonite, iron oxide, antimony oxide, titanium oxide (titania), lithopone, pumice powder, aluminum sulfate (glypsum, for example), zirconium carbonate, zirconium oxide, barium sulfate, barium carbonate, graphite, dolomite and molybenum disulfide. Among these inorganic fillers, powdery fillers with a grain size of at most about 50 $\mu$m, preferably at most about 40 $\mu$m, particularly preferably not more than 35 $\mu$m, are preferred. Further, those fiberous fillers with a diameter from about 1 to 500 $\mu$m, preferably from about 1 to 300 $\mu$m and with a length from about 0.1 to 6 mm, preferably from about 0.1 to 5 mm, are preferred. Further, flaky fillers with a diameter of at most about 30 $\mu$m, preferably at most about 10 $\mu$m are preferred. Among the inorganic fillers, flaky fillers and powdery fillers are particularly preferred. Suitable inorganic fillers can include, for example, talc, mica, silica, glass fibers and graphite.

Organic fillers which can be used include wood powder, organic fibers, straw, hulls (e.g., bran, rice hull and peanut hulls), etc.

A preferred wood powder has an average grain size of 12 mesh pass, and particularly preferably under 45 mesh pass. The kind of wood for the wood powder is not particularly restricted.

Organic fibers include animal fibers such as wool, vegetable fibers such of cotton, jute and pulp or synthetic fibers typically employed such as vinylon fibers, polyester fibers, nylon fibers and acryl fibers. The length and the average diameter of the organic fibers ae different depending on the application use and mixing conditions for the polypropylene composition finally obtained and, accordingly, are not particularly restricted. However, those with an average diameter from about 3 to 500 $\mu$m and an average length from about 0.1 to 6 mm are suitable.

In addition, straws can be cut and used to similar average diameters and lengths as the organic fibers.

Hulls and peanut hulls are pulverized and used like the wood powder.

In the case of blending the filler (particularly inorganic filler) for producing the composition according to the present invention, the rigidity of the composition can be further improved by additionally blending at least one of a second modified propylene polymer and a third ethylene copolymer.

(F) Second modified Propylene Polymer (2)

The second modified propylene polymer (hereafter referred to as "modified propylene polymer (2)") can be obtained by treating a propylene polymer with at least one of an $\alpha,\beta$-unsaturated carboxylic acid and an anhydride thereof (hereinafter referred to as a "carboxylic acid compound") and an organic peroxide.

The propylene polymer and the organic peroxide used for preparing the modified propylene polymer (2) may be of the same type as those used for preparing the modified propylene polymer (1).

(1) Carboxylic acid compound

The carboxylic acid compound used for preparing the modified propylene polymer (2) according to the present invention is an $\alpha,\beta$-unsaturated carboxylic acid or an anhydride thereof. The number of carbon atoms in the unsaturated carboxylic acid compound is usually up to 30, and preferably up to 25. The unsaturated carboxylic acid compound can be a monobasic unsaturated carboxylic acid, a dibasic unsaturated carboxylic acid, or an anhydride thereof. Typical examples of the monobasic unsaturated carboxylic acids include acrylic acid and methacrylic acid. Typical examples of the dibasic unsaturated carboxylic acids include maleic acid, fumaric acid, itaconic acid, citraconic acid and 3,6-endomethylene-1,2,3,6-tetrahydro-cis-phthalic acid. Further, the anhydride is the anhydride of the above-mentioned dibasic unsaturated carboxylic acid and can include maleic anhydride, citraconic anhydride and anhydride of 3,6-endomethylene-1,2,3,6-tetrahydro-cis-phthalic acid.

(2) Ratio of use

For preparing the modified olefin polymer (2), the amount of the carboxylic acid compound used, per 100 parts by weight of the propylene polymer, is from about 0.01 to 10 parts by weight, preferably from about 0.02 to 10 parts by weight, more preferably from about 0.02 to 7.0 parts by weight, and most preferably from about 0.1 to 7.0 parts by weight. If the ratio of the carboxylic acid compound used per 100 parts by weight of the propylene polymer is less than about 0.01 part by weight, the effect of improving the rigidity is insufficient. On the other hand, if the compound is used in excess of about 10 parts by weight, no improvement in the rigidity occurs with the increased amount of use.

The amount of the organic peroxide is from about 0.01 to 10 parts by weight, preferably from about 0.01 to 7.0 parts by weight, more preferably from about 0.02 to 5.0 parts by weight, most preferably from about 0.05 to 5.0 parts by weight, per 100 parts by weight of the propylene polymer, for the same reasons as for the modified propylene polymer (1).

(3) Production process for modified propylene polymer (2)

The modified propylene polymer (2) according to the present invention can be produced by heating the propylene polymer, the carboxylic acid compound and the organic peroxide at the above mixing ratios in the same manner as for the modified propylene polymer (1) described above. The heating temperature is the same as that for the modified propylene polymer (1) described above.

When blending the modified propylene polymer (2) with the filler, the amount of the modified propylene polymer per 100 parts by weight of the filler is usually up to about 100 parts by weight, preferably from about 10 to 100 parts by weight, more preferably from about 10 to 80 parts by weight, and particularly preferably from about 15 to 75 parts by weight. If the polymer is blended in excess of about 100 parts by weight per 100 parts by weight of the filler, no improvement in rigidity can occur in proportion with the amount used.

(G) Third Ethylene Copolymer

The third ethylene copolymer used in the present invention (hereafter referred to as "ethylene copolymer (III)") is a copolymer of ethylene and at least one monomer selected from the group consisting of an α,β-unsaturated monocarboxylic acid, an α,β-unsaturated dicarboxylic acid and anhydrides thereof. The copolymer includes the following copolymers:

(1) a copolymer of ethylene and and α,β-unsaturated monocarboxylic acid (hereinafter referred to as "ethylene copolymer (a)") and (2) a copolymer of ethylene and an α,β-unsaturated dicarboxylic acid, anhydride thereof or half ester thereof (hereinafter referred to as "ethylene copolymer (b)").

Among the ethylene copolymers, those melting at a temperature lower than 150° C. and having good fluidity are preferred.

(a) Ethylene copolymer (a)

The ethylene copolymer (a) is a copolymer at least containing ethylene and an α,β-unsaturated monocarboxylic acid and, for ensuring the fluidity described above, those copolymerized with a radical polymerizable colmonomer having at least one polar group described later (hereinafter referred to as "third ingredient") are preferred.

By copolymerizing the third ingredient as the comonomer, a multi-ingredient copolymer having a unit derived from the monomer corresponding to the copolymerizable third ingredient in the ethylene copolymer (a) can be obtained (the same applies to the ethylene copolymer (b) described later).

An α,β-unsaturated monocarboyxlic acid with 3 to 20 carbon atoms can generally be used for the production of the ethylene copolymer (a), and particularly, those with 3 to 16 carbon atoms ar preferred. Typical examples include acrylic acid, methacrylic acid, crotonic acid, monoalkyl maleate and monoalkyl fumarate.

The third ingredient is a radical polymerizable vinyl compound containing at least one polar group and typical examples thereof can include unsaturated carboxylic acid esters, vinyl esters and alkoxyalkyl acrylates.

The unsaturated carboxylic acid esters with 4 to 40 carbon atoms, particularly with 4 to 20 carbon atoms are preferred. Preferred examples have excellent heat stability, such as methyl (meth)acrylate and ethyl (meth)acrylate.

Further, the alkoxyalkyl usually has up to 20 carbon atoms. Those having an alkyl group with 1 to 8 carbon atoms, preferably 1 to 4 carbon atoms, are preferred, and those having an alkoxy group with 1 to 8 carbon atoms, preferably 1 to 4 carbon atoms, are preferred. Typical examples of preferred alkoxyalkyl acrylates include methoxyethyl acrylate, ethoxyethyl acrylate and butoxyethyl acrylate.

Further, the vinyl esters generally have up to 20 carbon atoms, preferably 4 to 16 carbon atoms. Typical examples include vinyl acetate, vinyl propionate, vinyl butyrate and vinyl pivalate.

In the ethylene copolymer (a), the amount of the third ingredient is preferably not more than about 25mol %, particularly preferably from about 2 to 20 mol %. Although the object of the present invention can be attained if the content is in excess of 25 mol %, it is not necessary to increase the content in excess of 25 mol % and it is not desired in view of production and economic reasons.

The amount of the α,β-unsaturated monocarboxylic acid in the ethylene copolymer (a) is not less than about 0.5 mol %, preferably not less than about 2.5 mol %, and particularly preferably from about 1.0 mol % to 15 mol %.

The α,β-unsaturated monocarboxylic acid serves to improve the compatibility at the boundary between the filler uniformly dispersed in the composition and the crystalline propylene polymer as the main ingredient, and improves the rigidity of the composition, and it is not necessarily used in excess. As the content is increased, the water absorption is increased to result in undesired effects, such as foaming upon molding fabrication and reduction in the electrical properties due to water absorption after molding, as well as disadvantages such as production problems, for example, safety, separation and recovery, and from the economic point of view. On the other hand, if the content is less than about 0.5 mol %, the improvement in rigidity is insufficient, although there is no problem for the adhesion.

(b) Ethylene copolymer (b)

The ethylene copolymer (b) used in the present invention may be a copolymer of ethylene and an α,β-unsaturated dicarboxylic acid, acid anhydride thereof or monoester thereof, and may optionally include the third ingredient for ethylene copolymer (a) described above. That is, ethylene copolymer (b) is prepared by direct copolymerization of ethylene with an α,β-unsaturated dicarboxylic acid or acid anhydride thereof, or copolymerization of these components with the third ingredient as described above.

As the third ingredient, the same compounds as used in ethylene copolymer (a) can be used.

In preparing ethylene copolymer (b) by the direct copolymerization process, the α,β-unsaturated dicarboxylic acid or anhydride thereof is selected as the copolymerization comonomer.

The α,β-unsaturated dicarboxylic acids with up to 20 carbon atoms, particularly 4 to 16 carbon atoms are preferred. Typical examples of the dicarboxylic acid include maleic acid, fumaric acid, itaconic acid, citraconic acid, 3,6-endomethylene-1,2,3,6-tetrahydro-cis-phthalic acid (NADIC ACID (registered trade mark)).

The amount of the α,β-unsaturated dicarboxylic acid or the anhydride thereof in the ethylene copolymer (b)

is from about 0.5 mol % to 20 mol %. More preferably, it is from about 1.0 to 15 mol %.

Both ethylene copolymer (a) and ethylene copolymer (b) may be prepared by copolymerizing ethylene and a copolymerizable comonomer (including the third ingredient) under a high pressure, e.g., from about 50 to 2500 kg/cm$^3$ at a temperature from about 120° to 260° C., in the presence of a chain transfer agent, for example, an organic peroxide. The copolymerization method is well-known.

The MFR (2) of the ethylene copolymer (a) and ethylene copolymer (b) is generally from about 0.01 to 1000 g/10 min., preferably from about 0.1 to 500 g/10 min., more preferably from about 1.0 to 500 g/10 min., and most preferably from about 5.0 to 500 g/10 min. If an ethylene copolymer with MFR (2) of less than about 0.01 g/10 min. is used, it is difficult to obtain uniform mixing upon preparing the mixture of the present invention and the moldability is insufficient as well.

In addition to the ingredients described above, blending of at least one of ethylene-propylene rubber (H) and ethylene-propylene copolymer (J) with the propylene polymer composition of the present invention is preferred since this can improve the impact resistance of the propylene polymer composition.

(H) Ethylene-Propylene Rubber

The ethylene-propylene rubber used in the present invention includes (a) an ethylene-propylene copolymer rubber obtained by copolymerization of ethylene and propylene, and (b) a multi-ingredient copolymer rubber mainly composed of ethylene and propylene and obtained by copolymerization thereof with a small amount of a comonomer (generally not more than about 10% by weight) such as a linear or branched diolefin having two double bonds at the terminal ends, for example 1,4-pentadiene, 1,5-hexadiene and 3,3-dimethyl-1,5-hexadiene, a linear or branched diolefin having only one double bond at the terminal end, for example, 1,4-hexadiene and 6-methyl-1,5-heptadiene, or a cyclodiene hydrocarbon such as bicyclo (2,2,1)heptene-2 and derivatives thereof. The ratio of the ethylene monomer unit to propylene monomer unit by weight in the copolymer rubber and the multi-ingredient copolymer rubber is usually from about 20/80 to 70/30, and particularly preferably from about 20/80 to 60/40. The ethylene-propylene rubber is produced by the copolymerization or multi-ingredient copolymerization of ethylene or propylene, or ethylene, propylene and the monomer described above.

The Mooney viscosity ($ML_{1+4}(100°$ C.)) of the ethylene-propylene rubber is from about 10 to 140, preferably from about 15 to 120, more preferably from about 30 to 110, and most preferably from about 30 to 100. If an ethylene-propylene rubber with a Mooney viscosity of less than about 10 is used, although the moldability can be improved, the improvement in the impact resistance is poor, and undesirable delamination may sometimes occur upon gate cutting of molding products. On the other hand, if rubber with a Mooney viscosity in excess of about 140 is used, dispersion upon kneading is difficult, and remarkable flow marks, weld lines, etc. become conspicuous at the surface of molding products, even if uniform composition can be obtained, and molding products of good appearance can not be obtained.

(J) Ethylene-Propylene Copolymer

The content of propylene in the ethylene-propylene copolymer used in the present invention is from about 15 to 40% by weight, preferably from about 18 to 40% by weight, and particularly preferably from about 20 to 38% by weight. If an ethylene-propylene copolymer with a propylene content of less than about 15% by weight is used, the effect of improving the impact resistance of the obtained composition is poor. On the other hand, if an ethylene-propylene copolymer with a propylene content in excess of about 40% by weight is used, although the effect for improving the impact resistance of the obtained composition is excellent, other mechanical properties, for example, rigidity, are not satisfactory.

The MFR (1) of the ethylene-propylene copolymer is from about 0.01 to 10 g/10 min., preferably from about 0.02 to 10 g/10 min., more preferably from about 0.05 to 8.0 g/10 min., and most preferably from about 0.1 to 8.0 g/10 min. If an ethylene-propylene copolymer with an MFR (1) less than about 0.01 g/10 min. is used, the workability of the obtained composition is not preferred. On the other hand, if an ethylene-propylene copolymer with an MFR (1) in excess of about 10 g/10 min. is used, the improvement in the impact resistance of the obtained composition is not satisfactory.

The Mooney viscosity ($ML_{1+4}(100°$ C.)) of the ethylene-propylene copolymer is usually from about 10 to 150, preferably from about 10 to 130, more preferably from about 10 to 120, and most preferably from about 30 to 100. If an ethylene-propylene copolymer with a Mooney viscosity of less than about 10 is used, although the moldability can be improved, the improvement of the impact resistance is low and delamination may occur upon gate cutting of the molded products. On the other hand, if an ethylene-propylene copolymer with a Mooney viscosity in excess of about 150 is used, dispersion upon kneading is difficult, and remarkable flow marks, well lines, etc. are conspicuous on the surface of the molded product, even if uniform composition can be obtained, thereby failing to obtain molded products of satisfactory appearance.

The ethylene-propylene copolymer preferably has a melting peak measured by Differential Scanning Calorimeter (DSC) of higher than about 80° C., and a degree of crystallinity measured by X-ray of greater than about 3%. The melting peak is preferably from about 80° to 125° C., and particularly preferably from about 85° to 125° C. If the melting peak is less than about 80° C., the rigidity and the tensile strength of the obtained composition are not satisfactory.

The degree of crystallinity of the ethylene-propylene copolymer measured by X-rays is preferably about from 3 to 30%, and particularly preferably from about 3 to 25%. If an ethylene-propylene copolymer with a degree of crystallinity of less than about 3% is used, the rigidity and the tensile strength are not satisfactory. While on the other hand, if the copolymer with a degree of crystallinity in excess of about 30% is used, the impact resistance is poor.

The ratio of weight average molecular weight ($\overline{Mw}$)/number average molecular weight ($\overline{Mn}$) as the index of the molecular weight distribution of the ethylene-propylene copolymer measured by gel permeation chromatography (GPC) is not less than about 4, preferably from about 4 to 8. If an ethylene-propylene copolymer with $\overline{Mw}/\overline{Mn}$ of less than about 4 is used, the workability of the obtained composition is not satisfactory.

An ethylene polymer (K) may further be blended with the composition according to the present invention.

(K) Ethylene Polymr

The density of the ethylene polymer used in the present invention is not less than about 0.900 g/cm$^3$, preferably from about 0.900 to 0.975 g/cm$^3$, and particularly preferably from about 0.910 to 0.970 g/cm$^3$.

The ethylene polymer includes an ethylene homopolymer, and a random or block copolymer of ethylene and an α-olefin. Those α-olefins with 3 to 12 carbon atoms, and preferably 3 to 8 carbon atoms, are useful. Typical examples of the α-olefin include propylene, butene-1, hexene-1, octene-1 and 4-methylpentene-1. The amount of the α-olefin is generally up to about 20% by weight, and particularly up to about 10% by weight of the ethylene polymer.

The MFR (2) of the ethylene polymer is at least about 0.1 g/10 min., preferably from about 0.1 to 50 g/10 min., more preferably from about 0.5 to 50 g/10 min., and most preferably from about 0.5 to 30 g/10 min. If a polymer with an MFR (2) of less than about 0.1 g/10 min. is used, the dispersibility is poor and it is difficult to obtain a uniform composition. Even if a uniform composition can be obtained, the improvement in adhesion is only slight and the appearance of the molded product is not satisfactory.

The amount of the modified propylene polymer (1) (component (C)) in the total amount of the entire polymeric material ((A), (B), (C), (D), (F), (G), (H), (J) and (K) (hereinafter referred to as the "total amount of the polymeric material")) in the composition according to the present invention from about 5.0 to 40% by weight, preferably from about 5.0 to 35% by weight, and particularly preferably from about 5.0 to 30% by weight. If the composition ratio of the modified propylene (1) is less than about 5.0% by weight, the improvement in adhesion properties is poor. On the other hand, if it is blended in excess of about 40% by weight, it increases cost.

In addition, the amount of the ethylene copolymer (II) (component (D)) in the total amount of the polymeric material is from about 3.0 to 30% by weight, preferably from about 3.0 go 25% by weight, and particularly preferably from about 5.0 to 25% by weight. If the composition ratio of the ethylene copolymer (II) in the total amount of the polymeric material is less than about 3.0% by weight, the improvement of adhesion is poor. On the other hand, if it exceeds about 30% by weight, it is not preferred from an economical point of view. Furthermore, the amount of the epoxy compound (calculated as the monomer) of the second ethylene copolymer (II) per 100 parts by weight of the total amount of the polymeric materials is from about 0.3 to 20 parts by weight, and preferably from about 0.5 to 17.5 parts by weight as the monomer unit for the same reasons described above.

The amount of the ethylene copolymer (I) (component (B)) in the total amount of the polymeric material is from about 5.0 to 30% by weight, preferably from about 5.0 to 25% by weight, and particularly preferably from about 6.0 to 25% by weight. If the amount of the ethylene copolymer (I) is less than about 5.0% by weight, the adhesion properties of the obtained composition with the adhesive is poor. On the other hand, if it exceeds about 30% by weight, the mechanical strength (particularly rigidity) is poor.

The total amount of the ethyl-propylene rubber (component (H)) and the ethylene-propylene copolymer (component (J)) in the total amount of the polymeric material is up to about 20% by weight, preferably from about 2.0 to 20% by weight, more preferably from about 3.0 to 15% by weight, and particularly preferably from about 5.0 to 15% by weight. If the ratio exceeds about 20% by weight, although the impact resistance of the composition is satisfactory, other mechanical properties, for example, rigidity, are not preferred.

In the case of blending the ethylene polymer (component (K)), the amount of this component in the total amount of the polymeric material is up to about 20%, preferably from about 0.5 to 20% by weight, more preferably from about 0.5 to 17% by weight, and most preferably from about 1.0 to 17% by weight. If the amount of the ethylene polymer in the total amount of the polymeric material exceeds about 20% by weight, the adhesion of the obtained composition is reduced.

In view of the above, the composition ratio of the crystalline propylene polymer (component (A)) in the total amount of the polymeric material is at least about 40% by weight, preferably at least about 45% by weight, and particularly preferably at least about 50% by weight. If the compositionm ratio fo the crystalline propylene polymer is less than about 40% by weight, the mechanical strength of the obtained composition is not satisfactory.

The total amount of the vinyl ester monomer unit and the unsaturated carboxylic acid ester monomer unit in the polymeric material is from about 2.5 to 10% by weight. If the amount of the unit derived from the vinyl acetate in the polymeric material is less than about 2.5% by weight, the adhesion properties of the obtained composition are poor. On the other hand, if the amount exceeds about 10% by weight, the mechanical strength (particularly, rigidity) of the composition is not satisfactory.

the amount of the filler (component (E)) per 100 parts by weight of the total amount of the polymeric material is up to about 40 parts by weight, preferably from about 0.1 to 40 parts by weight, more preferably from about 0.5 to 40 parts by weight, and particularly preferably from about 1.0 to 35 parts by weight. If the filler is blended at a composition ratio in excess of about 40 parts by weight per 100 parts by weight of the total amount of the polymeric material, not only is moldability decreased but also the adhesion is reduced and the impact resistance is poor.

The amount of the modified propylene polymer (2) (component (F)) is from about 10 to 100 parts by weight per 100 parts by weight of the filler, preferably from about 10 to 80 parts by weight, and particularly preferably from about 15 to 75 parts by weight. If the amount of the modified propylene polymer (2) is less than about 10 parts by weight per 100 parts by weight of the filler, the rigidity of the obtained composition is not satisfactory.

The amount of the ethylene polymer (III) (component (G)) is from about 10 to 100 parts by weight, preferably from about 10 to 80 parts by weight, particularly preferably from about 15 to 75 parts by weight, per 100 parts by weight of the filler. If the composition ratio of the ethylene copolymer is less than about 10 parts by weight per 100 parts by weight of the filler, the rigidity of the obtained composition is not satisfactory.

The amount of the monomer having polar groups of the ethylene copolymer (III) per 100 parts by weight of the total amount of the polymeric material is from about 0.017 to 40 parts by weight, and preferably from about 0.07 to 20 parts by weight as the monomer unit for the reasons as described above.

The composition according to the present invention can be prepare by uniformly blending the crystalline propylene polymer, first ethylene polymer (I), and at least one of first modified propylene polymer (1) and second ethylene copolymer (II); or further blending these polymeric materials and filler, with or without second modified propylene polymer (2) and/or third ethylene copolymer (III). In this case, additives such as stabilizers to oxygen, light or heat, flame retardant, workability improver, lubricant, antistatic agent and pigment generally used for olefinic polymers can also be used as required.

The composition can be obtained by dry blending using a mixer such as a tumbler, ribbon blender or Henschel mixer, by kneading using a batchwise kneader, for example, Banbury mixer or continuous kneader, for example, an extruder. However, it can be continuously kneaded by using the continuous mixer as described above. Further, it can be mixed more uniformly by the combined use of these methods, for example, applying dry blending and then continuous kneading.

The thus-obtained composition is usually molded into a pellet-like form and then prepared into desired molding products by conventional molding processes usually employed in the respective fields of thermoplastic resins such as injection molding, extrusion molding.

In the case of melt-kneading or molding upon preparing the composition, the temperature is higher than the melting point of the polymer employed but at a temperature not causing heat decomposition. In view of the above, the process is generally carried out at a temperature from about 180° to 280° C., preferably from about 200° to 260° C.

Without being bound by theory, it is considered that since the first ethylene copolymer (I) uniformly dispersed in the composition of the present invention is swollen by the solvent of the adhesive, the adhesive ingredient is diffused in the ethylene copolymer to provide a compatible effect. Further, since the grafted hydroxyl compound in the first modified propylene polymer (1) provides chemically active sites abundant in polar groups on the surface of the propylene polymer or the molded product therefrom and improves the compatibility with adhesive, it is considered that the effect of improved adhesion can be obtained without using any primer. Further, it is considered that the effect of improving the rigidity of the composition can be obtained since the second modified propylene polymer (2) acts to improve the compatibility at the boundary between the filler uniformly dispersed in the composition and the crystalline propylene polymer as the main ingredient.

The propylene polymer composition according to the present invention has the following advantages:
(1) Excellent in mechanical strength such as rigidity (bending modulus) and impact resistance.
(2) Satisfactory workability and moldability.
(3) Excellent appearance of molded product.
(4) Preferred adhesion with adhesives, which permits elimination of pre-treatment at the bonded surface (primer coating, plasma treatment, corona discharge treatment and UV-ray irradiation), as well as the reduction of adhesion problems and excellent adhesion after heat aging.

Since the propylene polymer composition according to the present invention has these unexpected advantages, it can be utilized in various applications. Typical examples can include those automobile components such as door liners, instrument panels and various types of linings.

EXAMPLES

The present invention is now described in greater detail with reference to specific examples, but the present invention is not to be construed as being limited thereto. Unless otherwise indicated, all parts, percents and ratios are by weight.

In the examples and comparative examples, the flexural modulus was measured according to ASTM D790 and the Izod impact strength was measured in accordance with ASTM D256. Further, for the adhesion at room temperature, flat plate test piece prepared by injection molding (140×140 mm, 3 mm thickness, embossed product) was sprayed with two-component system polychloroprene solvent adhesive (trade name: Hibon XA322-10, manufactured by Hitachi Kasei Polymer Co.), coated to a uniform thickness of from 100 to 150 g/m$^2$, dried at a temperature of 80° C. for 5 minutes and then appended to a sheet of polyvinyl chloride resin (PVC) (laminated with foam primer coated product of propylene resin; total thickness 3 mm) previously heated at 140° C. for 3 minutes on the foam surface of the propylene resin with each other, and then bonded under pressure by using a heat pressing machine (at 50° C. on the side of the flat plate test piece and at 150° C. on the side of the PVC sheet) under a pressure of 1 kg/cm$^2$ for 30 seconds. Then, the test piece was left in a thermostable chamber (temperature at 23° C., relative humidity at 65%) for 48 hours. The obtained test specimen was cut to 25 mm width and, after forcibly delaminating the PVC sheet from the resin part of the test piece, the remaining closely bonded portion was pulled by using a tensile tester at a speed of 200 mm/min. in the opposite direction to the PVC sheet (180°) and the bonding strength was determined by measuring the peeling strength. Furthermore, the heat resistant adhesion was determined by leaving the test piece obtained by the press bonding as described above in a thermostable chamber conditioned to 80° C. for 300 hours and applying tension in the same manner as described above at a temperature of 80° C. and then measuring the peeling strength.

(A) Crystalline Propylene Polymer

As the crystalline propylene polymer, there were used an ethylene-propylene block copolymer with an MFR (1) of 10 g/10 min. and a copolymerization ratio of ethylene of 11% by weight (hereinafter referred to as "PP(A)"), an ethylene-propylene block copolymer with an MFR (1) of 45 g/10 min. and a copolymerization ratio of ethylene of 12% by weight (hereinafter referred to as "PP(B)"), a propylene homopolymer with an MFR (1) of 8.0 g/10 min. (hereinafter referred to as "PP(C)"), an ethylene-propylene random copolymer with an MFR (1) of 12 g/10 min. and a copolymerization ratio of ethylene of 2.0% by weight (hereinafter referred to as "PP(D)") and an ethylene-propylene block copolymer with an MFR (1) of 10 g/10 min. and a copolymerization ratio of ethylene of 9% by weight (hereinafter referred to as "PP(E)").

(B) First Ethylene Copolymer (I)

As the first ethylene copolymer (I), there were used an ethylene-vinyl acetate copolymer with an MFR (2) of 30 g/10 min. and a copolymerization ratio of vinyl acetate of 33% by weight (hereinafter referred to as "EVA(a)"), an ethylene-vinyl acetate copolymer with an MFR (2) of 21 g/10 min. and a copolymerization ratio of vinyl acetate of 20% by weight (hereinafter referred to as "EVA(b)"), an ethylene-vinyl acetate copolymer with an MFR (2) of 7.2 g/10 min., and a copolymerization ratio of vinyl acetate of 4% by weight (hereinafter referred to as "EVA(c)"), an ethylene-methyl methacrylate copolymer with an MFR (2) of 45 g/10 min. and a copolymerization ratio of methyl methacrylate of 35% by weight (hereinafter referred to as "EMMA(a)"), an ethylene-methyl methacrylate with an MFR (2) of 3.0 g/10 min. and a copolymerization ratio of methyl methacrylate of 4.0% by weight (hereinafter referred to as "EMMA(b)") and an ethylene-ethyl acrylate copolymer with an MFR (2) of 20 g/10 min. and a copolymerization ratio of ethyl acrylate of 20% by weight (hereinafter referred to as "EEA").

(C) First Modified Propylene Copolymer (1)

Furthermore, for preparing the first modified propylene polymer (1), 4.0 parts by weight of 2-hydroxyethyl acrylate and 1.0 part by weight of 2,2'-bis(tertiary-butyl peroxyisopropyl)benzene were previously dry blended for 5 minutes with 100 parts by weight of an ethylene-propylene block copolymer with an MFR (1) of 0.05 g/10 min. and a copolymerization ratio of ethylene of 18% by weight using a Henschel mixer. The thus-obtained mixture was kneaded by using an extruder with vent (40 mm diameter, cylinder temperature at 160° to 200° C.) to produce pellets while kneading (hereinafter referred to as "modified PP(A)").

(D) Second Ethylene Copolymer (II)

Furthrmore, as the second ethylene copolymer (II), there were used an ethylene-glycidyl methacrylate copolymer with an MFR (2) of 3.0 g/10 min. and a copolymerization ratio of glycidyl methacrylate of 11.5% by weight (hereinafter referred as as "copolymer (1)"); an ethylene-vinyl acetate-glycidyl methacrylate terpolymer with an MFR (2) of 7.0 g/10 min., a copolymerization ratio of vinyl acetate of 4.9% by weight and a copolymerization ratio of glycidyl methacrylate of 10.5% by weight (hereinafter referred to as "copolymer (2)"); and an ethylene-methyl methacrylate-glycidyl methacrylate terpolymer with an MFR (2) of 30 g/10 min. a copolymerization ratio of methyl methacrylate of 18.6% by weight and a copolymerization ratio of the glycidyl methacrylate of 12.7% by weight (hereinafter referred to as "copolymer (3)").

(E) Filler

As the filler, there were used talc with an average grain size of 2.0 μm and aspect ratio of 5.5, mica with an average grain size of 7 μm and aspect ratio of 30 wood powder (45 mesh pass), ric hull (100 mesh pass) and jute fibers with an average diameter of 20 μm and average fiber length of 3 mm.

(F) Second Modified Propylene Polymer (2)

For preparing the second modified propylene polymer (2), 0.70 parts by weight of maleic anhydride and 0.4 part by weight of benzoyl peroxide were previously dry blended with 100 parts by weight of a propylene homopolymer with an MFR (1) of 0.6 g/10 min. by using a Henschel mixer for 5 minutes. The obtained mixture was kneaded to prepare pellets using an extruder (40 mm diameter, cylinder temperature at 180° to 230° C.) (hereinafter referred to as "modified PP(B)").

(G) Third Ethylene Copolymer (III)

As the third ethylene copolymer, there were used an ethylene-methacrylic acid copolymer with an MFR (2) of 300 g/10 min. and a copolymerization ratio of methacrylic acid of 25% by weight (hereinafter referred to as "EAA") and an ethylene-methyl methacrylate-maleic anhydride terpolymer with an MFR (2) of 65 g/10 min. and a copolymerization ratio of methyl methacrylate of 20.4% by weight and a copolymerization ratio of maleic anhydride of 4.1% by weight (hereinafter referred to as ("ET").

(H) Ethylene-Propylene Rubber

As the ethylene-propylene rubber, there were used an ethylene-propylene copolymer rubber with a Mooney viscosity ($ML_{1+4}$ (100° C.)) of 60 and a copolymerization ratio of propylene of 27% by weight (hereinafter referred to as "EPR") and an ethylene-propylene-ethylidene norbornene terpolymer rubber with a Mooney viscosity ($ML_{1+4}$ (100° C.)) of 36, a copolymerization ratio of propylene of 36% by weight and a copolymerization ratio of ethylidene norbornene of 6.0% by weight (hereinafter referred to as "EPDM").

(J) Ethylene-Propylene Copolymer

Further, as ethylene-propylene copolymer, there were used an ethylene-propylene copolymer with a copolymerization ratio of propylene of 22% by weight, a Mooney viscosity ($ML_{1+4}$ (100° C.)) of 95 and an MFR (1) of 0.06 g/10 min. (melting point: 115° C., degree of crystallinity: 20%, $\overline{Mw}/\overline{Mn}$ of 5.0; hereinafter referred to as "rubber (1)"); an ethylene-propylene copolymer with a copolymerization ratio of propylene of 37% by weight, a Mooney viscosity ($ML_{1+4}$ (100° C.)) of 41 and an MFR (1) of 1.0 g/10 min. (melting point: 105° C., degree of crystallinity: 7.5%, $\overline{Mw}/\overline{Mn}$ of 4.8; hereinafter referred to as "rubber (2)"); and an ethylene-propylene copolymer with a copolymerization ratio of propylene of 24% by weight, a Mooney viscosity ($ML_{1+4}$ (100° C.)) of 12 and an MFR (1) at 4.5 g/10 min. (melting point: 110° C., degree of crystallinity: 21%, Mw/Mn of 5.8; hereinafter referred to as "rubber (3)").

(K) Ethylene Polymer

There were further used a high density polyethylene with a MFR (2) of 1.0 g/10 min. and a density of 0.950 g/cm³ (hereinafter referred to as "PE(a)"), an ethylene-butene-1 linear copolymer with an MFR (2) of 7.1 g/10 min. and a density of 0.920 g/cm³ (copolymerization ratio of butene-1 of 8.2% by weight; hereinafter referred to as "PE(b)") and a high pressure process low density polyethylene with an MFR (2) of 3.0 g/10 min. and a density of 0.920 g/cm³ (hereinafter referred to as "PE(c)").

EXAMPLES 1 TO 11 AND COMPARATIVE EXAMPLES 1 TO 9

Crystalline propylene polymers (hereinafter referred to as "PP"), ethylene-vinyl acetate copolymers (hereinafter referred to as "EVA" and fillers (respective blending amounts and kinds of which are shown in Table 1), as well as modified PP(A) (the blending amount of which is shown in Table 1) were mixed for 5 minutes using a super mixer. Each of the mixtures thus obtained was kneaded and formed into pellets (composition) by using a two-axis extruder with a vent (cylinder temperature at 180° to 200° C., diameter of 30 mm). Flat plates and specimens for the measurement of bending modulus and specimens for the measurement of Izod impact shock strength were prepared from each of the pellets by using a 5 ounce injection molding machine. Measurement was carried out of the Izod impact strength (measured at a temperature of 23° C.) and the flexural modulus, as well as for the room temperature adhesion and heat resistance adhesion for each of the obtained test specimens. The results are shown in Table 2.

In the column of "room temperature adhesion" and "heat resistant adhesion" in Table 2, "breaking in material" means that the foam of the propylene resin was broken (here and hereinafter).

TABLE 1

| | PP | | EVA | | | Filler | |
|---|---|---|---|---|---|---|---|
| | Kind | Blending amount (parts by weight) | Kind | Blending amount (parts by weight) | Blending amount of modified PP(A) (parts by weight) | Kind | Blending amount (parts by weight) |
| Example No. | | | | | | | |
| 1 | PP(A) | 75 | EVA(a) | 15 | 10 | — | 0 |
| 2 | " | " | " | " | " | talc | 15 |
| 3 | " | " | " | " | " | " | 30 |
| 4 | " | " | " | " | " | mica | 15 |
| 5 | " | " | " | " | " | wood powder | " |
| 6 | PP(B) | " | " | " | " | talc | " |
| 7 | PP(C) | " | " | " | " | " | " |
| 8 | PP(D) | " | " | " | " | " | " |
| 9 | PP(A) | 70 | " | 20 | " | " | " |
| 10 | " | " | EVA(b) | " | " | " | " |
| 11 | " | 68 | EVA(a) | 7 | 25 | " | 25 |
| Comparative Example No. | | | | | | | |
| 1 | PP(A) | 92 | EVA(a) | 4 | 4 | talc | 15 |
| 2 | " | 90 | " | 10 | 0 | " | " |
| 3 | " | " | — | 0 | 10 | " | " |
| 4 | " | 85 | EVA(c) | 15 | " | " | " |
| 5 | " | 55 | EVA(a) | 35 | " | " | " |
| 6 | " | 75 | " | 15 | " | mica | 45 |
| 7 | " | 100 | — | 0 | 0 | — | 0 |
| 8 | " | " | — | 0 | 0 | talc | 20 |
| 9 | " | 80 | EVA(a) | 20 | 0 | " | " |

TABLE 2

| | Peeling Strength (kg/25 mm) | | Flexural modulus (kg/cm$^2$) | Izod impact strength (with notch) (kg · cm/cm) |
|---|---|---|---|---|
| | Room Temperature | Heat resistant | | |
| Example No. | | | | |
| 1 | Breaking in material | Breaking in material | 8,500 | 15.6 |
| 2 | " | " | 12,900 | 10.5 |
| 3 | " | " | 17,600 | 8.3 |
| 4 | " | " | 20,200 | 4.5 |
| 5 | " | " | 14,100 | 2.3 |
| 6 | " | " | 12,200 | 4.5 |
| 7 | " | " | 15,300 | 3.1 |
| 8 | " | " | 9,700 | 3.6 |
| 9 | " | " | 11,300 | 12.3 |
| 10 | " | " | 14,500 | 13.4 |
| 11 | " | " | 20,700 | 7.6 |
| Comparative Example No. | | | | |
| 1 | 1.5 | 0.8 | 16,600 | 8.2 |
| 2 | 1.8 | 0.7 | 8,900 | 8.7 |
| 3 | 1.3 | 0.9 | 18,100 | 7.5 |
| 4 | 1.6 | 1.0 | 14,900 | 12.6 |
| 5 | Breaking in material | Breaking in material | 5,300 | Not broken |
| 6 | 1.7 | 1.2 | 31,000 | 3.8 |
| 7 | 1.4 | 0.5 | 12,000 | 8.0 |
| 8 | 1.2 | 0.5 | 21,800 | 6.5 |
| 9 | Breaking in material | 1.0 | 14,500 | 9.2 |

EXAMPLES 12 TO 23 AND COMPARATIVE EXAMPLES 10 TO 18

PP's, EVA's, ethylene polymers (hereinafter referred to as "PE"), and the fillers (respective blending amounts and the kinds of which are shown in Table 3), as well as modified PP(A) (the blending amount of which is shown in Table 3) were mixed for 5 minutes by using a super mixer. Pellets were prepared in the same manner as in Example 1 using each of the mixtures obtained and measurement was conducted of the Izod impact strength and the flexural modulus, as well as measurement for the room temperature adhesion and heat resistant adhesion. The results are shown in Table 4.

TABLE 3

|  | PP | | EVA | | PE | | Blending amount of modified PP(A) (parts by weight) | Filler | |
|---|---|---|---|---|---|---|---|---|---|
|  | Kind | Blending amount (parts by weight) | Kind | Blending amount (parts by weight) | Kind | Blending amount (parts by weight) |  | Kind | Blending amount (parts by weight) |
| Example No. | | | | | | | | | |
| 12 | PP(A) | 70 | EVA(a) | 10 | PE(a) | 10 | 10 | — | 0 |
| 13 | " | " | " | " | " | " | " | talc | 20 |
| 14 | PP(B) | " | " | " | " | " | " | " | " |
| 15 | PP(C) | " | " | " | " | " | " | " | " |
| 16 | PP(D) | " | " | " | " | " | " | " | " |
| 17 | PP(A) | " | EVA(b) | " | " | " | " | " | " |
| 18 | " | 60 | EVA(a) | " | PE(b) | " | 20 | mica | " |
| 19 | " | " | " | " | PE(c) | " | " | " | " |
| 20 | " | 66 | " | 20 | PE(a) | 7 | 7 | " | " |
| 21 | " | 68 | " | 10 | " | 15 | " | " | " |
| 22 | " | " | " | " | " | 7 | 15 | wood powder | 15 |
| 23 | " | " | " | " | " | " | 15 | jute | " |
| Comparative Example No. | | | | | | | | | |
| 10 | PP(A) | 88 | EVA(a) | 4 | PE(a) | 4 | 4 | talc | 20 |
| 11 | " | 85 | " | 15 | — | 0 | 0 | " | " |
| 12 | " | 75 | " | " | PE(a) | 10 | 0 | " | " |
| 13 | " | 65 | EVA(c) | " | " | " | 10 | " | " |
| 14 | " | 45 | EVA(a) | 35 | " | " | " | " | " |
| 15 | PP(B) | 100 | — | 0 | — | 0 | 0 | — | 0 |
| 16 | " | " | — | 0 | — | 0 | 0 | mica | 20 |
| 17 | PP(A) | 80 | — | 0 | — | 0 | 20 | " | " |
| 18 | " | 77 | EVA(a) | 23 | — | 0 | 0 | " | 10 |

TABLE 4

|  | Peeling strength (kg/25 mm) | | Flexural modulus (kg/cm²) | Izod impact strength (with notch) (kg·cm/cm) |
|---|---|---|---|---|
|  | Room temperature | Heat resistant | | |
| Example No. | | | | |
| 12 | Breaking in material | Breaking in material | 10,700 | 23.3 |
| 13 | " | " | 15,200 | 13.7 |
| 14 | " | " | 16,400 | 11.6 |
| 15 | " | " | 17,800 | 5.3 |
| 16 | " | " | 12,100 | 6.8 |
| 17 | " | " | 16,300 | 12.9 |
| 18 | " | " | 21,500 | 4.7 |
| 19 | " | " | 20,900 | 4.3 |
| 20 | " | " | 19,200 | 5.5 |
| 21 | " | " | 22,700 | 5.1 |
| 22 | " | " | 15,800 | 2.9 |
| 23 | " | " | 18,300 | 8.7 |
| Comparative Example No. | | | | |
| 10 | 1.8 | 1.1 | 19,200 | 7.9 |
| 11 | 2.1 | 1.0 | 15,900 | 8.1 |
| 12 | Breaking in material | 1.2 | 14,600 | 14.2 |
| 13 | 1.8 | 1.1 | 15,900 | 12.9 |
| 14 | Breaking in material | Breaking in material | 6,900 | Not broken |
| 15 | 1.2 | 0.4 | 15,200 | 6.5 |
| 16 | 0.9 | 0.4 | 28,700 | 2.7 |
| 17 | 2.2 | 1.3 | 27,200 | 3.1 |
| 18 | Breaking in material | 1.3 | 14,400 | 5.3 |

EXAMPLES 24 TO 35 AND COMPARATIVE EXAMPLES 19 TO 29

PP's, EVA's, ethylene-propylene rubbers (hereinafter referred to as "rubber") and the fillers (respective blending amounts and the kinds of which are shown in Table 5), as well as modified PP(A) (the blending amount of which is shown in Table 5) were mixed for 5 minutes and the heat resistant adhesion. The results are shown in Table 6.

TABLE 5

| | PP | | EVA | | Rubber | | Blending amount of modified PP(A) (parts by weight) | Filler | |
|---|---|---|---|---|---|---|---|---|---|
| | Kind | Blending amount (parts by weight) | Kind | Blending amount (parts by weight) | Kind | Blending amount (parts by weight) | | Kind | Blending amount (parts by weight) |
| Example No. | | | | | | | | | |
| 24 | PP(A) | 70 | EVA(a) | 10 | EPR | 10 | 10 | — | 0 |
| 25 | " | " | " | " | " | " | " | talc | 20 |
| 26 | PP(B) | " | " | " | " | " | " | " | " |
| 27 | PP(C) | " | " | " | " | " | " | " | " |
| 28 | PP(D) | " | " | " | " | " | " | " | " |
| 29 | PP(A) | " | EVA(b) | " | " | " | " | " | " |
| 30 | " | " | EVA(a) | " | EPDM | " | " | " | " |
| 31 | PP(C) | 68 | EVA(b) | 20 | " | 5 | 7 | mica | " |
| 32 | " | 71 | EVA(a) | 7 | EPR | 15 | " | " | " |
| 33 | PP(A) | 70 | " | " | " | 3 | 20 | " | 10 |
| 34 | " | 78 | " | 10 | " | 5 | 7 | wood powder | 15 |
| 35 | " | " | " | " | " | " | " | jute | " |
| Comparative Example No. | | | | | | | | | |
| 19 | PP(A) | 100 | — | 0 | — | 0 | 0 | — | 0 |
| 20 | " | 80 | EVA(a) | 20 | — | 0 | 0 | talc | 20 |
| 21 | " | 70 | " | 10 | EPR | 10 | 0 | " | " |
| 22 | PP(B) | 88 | " | 4 | " | 4 | 4 | " | " |
| 23 | " | 65 | EVA(c) | 15 | " | 10 | 10 | " | " |
| 24 | PP(A) | 80 | — | 0 | — | 0 | 20 | mica | " |
| 25 | " | 100 | — | 0 | — | 0 | 0 | " | " |
| 26 | " | 45 | EVA(a) | 35 | EPDM | 10 | 10 | talc | 20 |
| 27 | PP(D) | 50 | " | 10 | " | 30 | " | " | " |
| 28 | PP(A) | 75 | — | 0 | EPR | 10 | 15 | " | " |
| 29 | " | 70 | EVA(a) | 10 | " | " | 10 | " | 45 |

TABLE 6

| | Peeling strength (kg/25 mm) | | Flexural modulus (kg/cm$^2$) | Izod impact strength (with notch) (kg.cm/cm) |
|---|---|---|---|---|
| | Room temperature | Heat resistant | | |
| Example No. | | | | |
| 24 | Breaking in material | Breaking in material | 10,300 | 29.1 |
| 25 | " | " | 13,600 | 21.7 |
| 26 | " | " | 13,900 | 19.5 |
| 27 | " | " | 15,300 | 8.7 |
| 28 | " | " | 11,200 | 9.8 |
| 29 | " | " | 13,900 | 20.3 |
| 30 | " | " | 14,400 | 22.2 |
| 31 | " | " | 18,100 | 5.8 |
| 32 | " | " | 16,500 | 8.9 |
| 33 | " | " | 14,100 | 7.6 |
| 34 | " | " | 14,200 | 3.5 |
| 35 | " | " | 16,800 | 15.3 |
| Comparative Example No. | | | | |
| 19 | 1.2 | 0.4 | 15,200 | 6.5 |
| 20 | Breaking in material | 1.3 | 13,200 | 9.2 |
| 21 | " | 1.1 | 15,300 | 19.8 |
| 22 | 1.9 | 1.3 | 17,800 | 8.2 |
| 23 | 1.9 | 1.2 | 13,900 | 21.3 |
| 24 | 2.0 | 1.3 | 26,400 | 2.8 |
| 25 | 0.7 | 0.4 | 28,100 | 2.6 |
| 26 | Breaking in material | Breaking in material | 6,300 | Not broken |
| 27 | " | " | 8,700 | " |
| 28 | 1.7 | 1.1 | 17,800 | 15.4 |
| 29 | 1.6 | 0.8 | 36,600 | 8.5 | minutes by using a super mixer. Pellets were prepared in the same manner as in Example 1 using each of the thus-obtained mixtures and measurement was conducted of the Izod impact strength and the flexural modulus, as well as for the room temperature adhesion

EXAMPLES 36 TO 46 AND COMPARATIVE EXAMPLES 30 TO 38

PP's, EVA's, fillers, PE and rubber (respective blending amounts and the kinds of which are shown in Table 7), as well as modified PP(A) and second modified PP(B) (blending amount of which is shown in Table 7) were mixed for 5 minutes by using a super mixer. Pellets were prepared in the same manner as in Example 1 using each of the thus-obtained mixtures and measurement was conducted of the Izod impact strength and the flexural modulus, as well as for the room temperature adhesion and the heat resistant adhesion. The results are shown in Table 8.

TABLE 7-1

| Example No. | PP Kind | PP Blending amount (parts by weight) | EVA Kind | EVA Blending amount (parts by weight) | Blending amount of modified PP(A) (parts by weight) | Blending amount of modified PP(B) (parts by weight) | PE of Rubber Kind | PE of Rubber Blending amount (parts by weight) | Filler Kind | Filler Blending amount (parts by weight) |
|---|---|---|---|---|---|---|---|---|---|---|
| 36 | PP(E) | 70 | EVA(a) | 15 | 10 | 5 | — | 0 | — | 0 |
| 37 | " | " | " | " | " | " | — | 0 | talc | 20 |
| 38 | " | 60 | " | " | " | " | PE(a) | 10 | " | " |
| 39 | " | " | " | " | " | " | EPR | " | " | " |
| 40 | " | 55 | " | " | " | " | PE(a)[1] | 10 | mica[2] | 5 |
| 41 | PP(C) | 58 | " | " | " | 7 | EPDM | " | talc | 20 |
| 42 | PP(D) | 55 | " | 10 | " | 10 | PE(a) | 15 | mica[2] | 10 |
| 43 | PP(E) | 56 | " | 20 | " | 7 | PE(c) | 10 | mica | " |
| 44 | " | 63 | " | 10 | " | " | — | 0 | talc | 20 |
| 45 | " | 68 | " | " | " | " | — | 0 | wood powder | 15 |
| 46 | " | " | " | " | " | " | — | 0 | hull | " |

[1] 5 parts by weight of EPR was further blended.
[2] 10 parts by weight of talc was further blended.

TABLE 7-2

| Comparative Example No. | PP Kind | PP Blending amount (parts by weight) | EVA Kind | EVA Blending amount (parts by weight) | Blending amount of modified PP(A) (parts by weight) | Blending amount of modified PP(B) (parts by weight) | PE or Rubber Kind | PE or Rubber Blending amount (parts by weight) | Filler Kind | Filler Blending amount (parts by weight) |
|---|---|---|---|---|---|---|---|---|---|---|
| 30 | PP(E) | 75 | EVA(a) | 20 | 0 | 5 | — | 0 | talc | 20 |
| 31 | " | " | — | 0 | 20 | " | — | 0 | " | " |
| 32 | " | 66 | EVA(a) | 4 | 15 | " | PE(a) | 10 | " | " |
| 33 | " | 61 | " | 15 | 4 | " | EPR | 15 | " | " |
| 34 | " | 50 | " | 35 | 10 | " | — | 0 | " | " |
| 35 | PP(C) | 100 | — | 0 | 0 | 0 | — | 0 | — | 0 |
| 36 | " | " | — | 0 | 0 | 0 | — | 0 | wood powder | 15 |
| 37 | " | 63 | EVA(c) | 20 | 10 | 7 | — | 0 | talc | 20 |
| 38 | PP(D) | 45 | EVA(a) | 15 | " | 5 | EPDM | 25 | " | " |

TABLE 8-1

| Example No. | Peeling strength (kg/25 mm) Room temperature | Peeling strength (kg/25 mm) Heat resistance | Flexural modulus (kg/cm²) | Izod impact strength (with notch) (kg · cm/cm) |
|---|---|---|---|---|
| 36 | Breaking in material | Breaking in material | 11,400 | 13.7 |
| 37 | " | " | 17,800 | 7.3 |
| 38 | " | " | 16,300 | 12.5 |
| 39 | " | " | 14,700 | 20.6 |
| 40 | " | " | 15,200 | 14.5 |
| 41 | " | " | 15,600 | 19.8 |
| 42 | " | " | 18,900 | 9.4 |
| 43 | " | " | 25,300 | 6.1 |
| 44 | " | " | 19,500 | 6.8 |
| 45 | " | " | 16,700 | 3.4 |

TABLE 8-2

| Comparative Example No. | Peeling strength (kg/25 mm) Room temperature | Peeling strength (kg/25 mm) Heat resistant | Flexural modulus (kg/cm²) | Izod impact strength (with notch) (kg · cm/cm) |
|---|---|---|---|---|
| 30 | Breaking in material | 1.2 | 15,300 | 7.8 |
| 31 | 1.9 | " | 24,200 | 6.3 |
| 32 | 2.1 | 1.3 | 24,800 | 10.1 |
| 33 | Breaking in material | 1.5 | 15,400 | 38.9 |
| 34 | " | Breaking in material | 7,500 | 35.5 |
| 35 | 0.5 | 0.3 | 14,800 | 2.0 |
| 36 | 1.3 | 0.6 | 19,700 | 1.8 |
| 37 | 1,8 | 0.9 | 16,500 | 4.2 |
| 38 | Breaking in material | Breaking in material | 8,200 | Not broken |

EXAMPLES 47 TO 58 AND COMPARATIVE EXAMPLES 39 TO 49

PP's, EVA's, PE's, rubbers and fillers (respective blending amounts and the kinds of which are shown in Table 9), as well as modified PP(A) (the blending amount of which is shown in Table 9) were mixed for 5 minutes by using a super mixer. Pellets were prepared in the same manner as in Example 1 from each of the mixture thus-obtained, and measurement was conducted of the Izod Impact strength and the flexural modulus, as well as for the room temperature adhesion and the heat resistant adhesion. The results are shown in Table 10.

TABLE 9-1

| Example No. | PP Kind | PP Blending amount (parts by weight) | EVA Kind | EVA Blending amount (parts by weight) | Rubber Kind | Rubber Blending amount (parts by weight) | Blending amount of modified PP(A) (parts by weight) | PE Kind | PE Blending amount (parts by weight) | Filler Kind | Filler Blending amount (parts by weight) |
|---|---|---|---|---|---|---|---|---|---|---|---|
| 47 | PP(E) | 70 | EVA(a) | 10 | EPR | 5 | 10 | PE(a) | 5 | — | 0 |
| 48 | " | " | " | " | " | " | " | " | " | talc | 20 |
| 49 | PP(B) | " | " | " | " | " | " | " | " | " | " |
| 50 | PP(C) | 65 | " | " | " | " | 15 | " | " | " | " |
| 51 | " | 60 | " | " | " | " | " | PE(b) | 10 | mica | " |
| 52 | " | 65 | " | " | " | " | " | PE(c) | 5 | mica | " |
| 53 | PP(D) | 70 | EVA(b) | " | " | " | 10 | PE(a) | " | " | " |
| 54 | " | 65 | " | " | EPDM | 10 | 10 | " | " | " | " |
| 55 | " | 61 | " | 7 | " | 7 | 20 | " | " | " | " |
| 56 | " | 67 | " | 20 | EPR | 3 | 7 | " | 3 | mica | 20 |
| 57 | " | 70 | " | 10 | " | 5 | 10 | " | 5 | wood powder | 15 |
| 58 | " | 70 | " | " | " | 5 | " | " | " | jute | 15 |

TABLE 9-2

| Comparative Example No. | PP Kind | PP Blending amount (parts by weight) | EVA Kind | EVA Blending amount (parts by weight) | Rubber Kind | Rubber Blending amount (parts by weight) | Blending amount of modified PP(A) (parts by weight) | PE Kind | PE Blending amount (parts by weight) | Filler Kind | Filler Blending amount (parts by weight) |
|---|---|---|---|---|---|---|---|---|---|---|---|
| 39 | PP(E) | 100 | — | 0 | — | 0 | 0 | — | 0 | — | 0 |
| 40 | " | 80 | EVA(a) | 20 | — | 0 | 0 | — | 0 | talc | 15 |
| 41 | " | 70 | " | 15 | EPR | 10 | 0 | — | 0 | " | 20 |
| 42 | PP(B) | 88 | " | 4 | " | 4 | 4 | PE(a) | 4 | mica | 20 |
| 43 | PP(E) | 65 | EVA(c) | 15 | " | 10 | 10 | " | 5 | " | " |
| 44 | " | 80 | — | 0 | — | 0 | 20 | — | 0 | " | " |
| 45 | " | 100 | — | 0 | — | 0 | 0 | — | 0 | talc | 20 |
| 46 | " | 45 | EVA(a) | 35 | EPDM | 10 | 10 | PE(b) | 10 | " | 20 |
| 47 | PP(D) | 55 | " | 10 | " | 25 | 10 | " | " | " | " |
| 48 | PP(E) | 75 | — | 0 | EPR | 10 | 15 | " | 10 | " | " |
| 49 | " | 80 | EVA(a) | 20 | " | 0 | 0 | — | 0 | wood powder | 20 |

TABLE 10-1

| Example No. | Peeling strength (kg/25 mm) Room temperature | Peeling strength (kg/25 mm) Heat resistant | Flexural modulus (kg/cm$^2$) | Izod impact strength (with notch) (kg.cm/cm) |
|---|---|---|---|---|
| 47 | Breaking in material | Breaking in material | 11,100 | 26.2 |
| 48 | " | " | 14,300 | 14.7 |
| 49 | " | " | 14,500 | 13.6 |
| 50 | " | " | 16,400 | 5.8 |
| 51 | " | " | 19,200 | 4.2 |
| 52 | " | " | 21,700 | 3.3 |
| 53 | " | " | 18,200 | 4.3 |
| 54 | " | " | 13,200 | 23.5 |
| 55 | " | " | 14,800 | 15.6 |
| 56 | " | " | 16,500 | 4.7 |
| 57 | " | " | 13,900 | 3.8 |
| 58 | " | " | 15,400 | 16.1 |

TABLE 10-2

| Comparative Example No. | Peeling strength (kg/25 mm) Room temperature | Peeling strength (kg/25 mm) Heat resistant | Flexural modulus (kg/cm$^2$) | Izod impact strength (with notch) (kg.cm/cm) |
|---|---|---|---|---|
| 39 | 1.2 | 0.4 | 15,200 | 6.5 |
| 40 | Breaking in material | 0.9 | 12,300 | 9.6 |
| 41 | " | 0.8 | 13,300 | 17.2 |
| 42 | 1.4 | 0.7 | 23,800 | 3.6 |
| 43 | 2.0 | 1.2 | 18,700 | 5.8 |
| 44 | 2.0 | 1.3 | 26,400 | 2.8 |
| 45 | 0.6 | 0.4 | 24,100 | 5.2 |
| 46 | Breaking in material | Breaking in material | 5,900 | Not broken |
| 47 | " | " | 8,100 | Not broken |
| 48 | 1.9 | 1.2 | 16,300 | 14.9 |
| 49 | Breaking in material | 1.3 | 13,600 | 2.8 |

EXAMPLES 59 TO 71 AND COMPARATIVE EXAMPLES 50 TO 58

PP's, ethylene-unsaturated carboxylic acid ester copolymer (hereinafter referred to as "copolymer"), PE's, rubbers and fillers (the respective blending amounts and the kinds of which are shown in Table 11), as well as the modified propylene polymer (1) (referred to as modified PP(A)) and the modified propylene polymer (2) (referred to as modified PP(B)) the blending amount of which are shown in Table 11 were mixed for 5 minutes by using a super mixer. Pellets were prepared in the same manner as in Example 1 from each of the mixtures thus obtained, and measurement was conducted of the Izod impact strength and the flexural modulus, as well the room temperature adhesion and the heat resistant adhesion. The results are shown in Table 12.

TABLE 11-1

| Example No. | PP Kind | PP Blending amount (parts by weight) | Copolymer Kind | Copolymer Blending amount (parts by weight) | Blending amount of modified PP(A) (parts by weight) | Blending amount of modified PP(B) (parts by weight) | PE or Rubber Kind | PE or Rubber Blending amount (parts by weight) | Filler Kind | Filler Blending amount (parts by weight) |
|---|---|---|---|---|---|---|---|---|---|---|
| 59 | PP(E) | 75 | EMMA(a) | 15 | 10 | 0 | — | 0 | — | 0 |
| 60 | " | 70 | " | " | " | 5 | — | 0 | talc | 20 |
| 61 | " | 60 | " | " | " | " | PE(a) | 10 | " | " |
| 62 | " | 65 | " | " | " | " | EPR | " | " | " |
| 63 | " | " | " | " | " | " | PE(a)[1] | 5 | talc[2] | 10 |
| 64 | " | " | EEA | " | " | " | PE(a)[1] | " | talc[2] | " |
| 65 | PP(C) | " | EMMA(a) | " | " | 7 | EPDM | 10 | talc | 20 |
| 66 | PP(D) | 55 | " | " | " | 10 | PE(a) | 15 | talc[3] | 10 |
| 67 | PP(E) | 54 | " | 20 | 7 | 7 | PE(b) | 10 | mica | 30 |
| 68 | " | 63 | " | 10 | 20 | " | — | 0 | talc | 20 |
| 69 | " | 68 | " | " | 15 | " | — | 0 | wood powder | 15 |
| 70 | " | " | " | " | " | " | — | 0 | jute | " |
| 71 | " | 60 | " | 15 | 10 | 5 | PE(b) | 10 | talc | 20 |

[1] 5 parts by weight of EPR was further blended.
[2] 5 parts by weight of mica was further blended.
[3] 10 parts by weight of mica was further blended.

TABLE 11-2

| Comparative Example No. | PP Kind | PP Blending amount (parts by weight) | Copolymer Kind | Copolymer Blending amount (parts by weight) | Blending amount of modified PP(A) (parts by weight) | Blending amount of modified PP(B) (parts by weight) | PE or Rubber Kind | PE or Rubber Blending amount (parts by weight) | Filler Kind | Filler Blending amount (parts by weight) |
|---|---|---|---|---|---|---|---|---|---|---|
| 50 | PP(E) | 75 | EMMA(a) | 20 | 0 | 5 | — | 0 | talc | 20 |
| 51 | " | " | — | 0 | 20 | " | — | 0 | " | " |
| 52 | " | 66 | EMMA(a) | 4 | 15 | " | PE(a) | 10 | " | " |
| 53 | " | 61 | " | 15 | 4 | " | EPR | 15 | " | " |
| 54 | " | 56 | EEA | 35 | " | " | " | " | " | " |
| 55 | PP(C) | 80 | EMMA(a) | 20 | 0 | 0 | — | 0 | — | 0 |
| 56 | " | 100 | — | 0 | 0 | 0 | — | 0 | wood powder | 15 |
| 57 | " | 63 | EMMA(b) | 20 | 10 | 7 | — | 0 | talc | 20 |
| 58 | PP(D) | 45 | EMMA(a) | 15 | " | 5 | EPDM | 25 | " | " |

TABLE 12-1

| Example No. | Peeling strength (kg/25 mm) Room temperature | Peeling strength (kg/25 mm) Heat resistant | Flexural modulus (kg/cm²) | Izod impact strength (with notch) (kg·cm/cm) |
|---|---|---|---|---|
| 59 | Breaking in material | Breaking in material | 11,700 | 12.8 |
| 60 | " | " | 18,100 | 7.0 |
| 61 | " | " | 16,800 | 11.1 |
| 62 | " | " | 14,900 | 19.9 |
| 63 | " | " | 16,300 | 11.6 |
| 64 | " | " | 17,200 | 10.7 |
| 65 | " | " | 16,400 | 18.2 |
| 66 | " | " | 19,300 | 8.6 |
| 67 | " | " | 25,800 | 5.7 |
| 68 | " | " | 20,600 | 6.5 |
| 69 | " | " | 18,500 | 3.1 |
| 70 | " | " | 18,800 | 10.2 |
| 71 | " | " | 12,300 | 12.8 |

TABLE 12-2

| Comparative Example No. | Peeling strength (kg/25 mm) Room temperature | Peeling strength (kg/25 mm) Heat resistant | Flexural modulus (kg/cm²) | Izod impact strength (with notch) (kg·cm/cm) |
|---|---|---|---|---|
| 50 | Breaking in material | 1.0 | 15,800 | 7.4 |
| 51 | 1.9 | 1.2 | 24,500 | 5.9 |
| 52 | 1.7 | 1.3 | 21,900 | 9.8 |
| 53 | Breaking in material | 1.5 | 16,700 | 35.6 |
| 54 | " | Breaking in material | 7,900 | 36.7 |
| 55 | " | 0.9 | 11,200 | 4.8 |
| 56 | 1.3 | 0.6 | 19,700 | 1.8 |
| 57 | 1.7 | 0.8 | 15,100 | 4.8 |
| 58 | Breaking in material | Breaking in material | 8,300 | Not broken |

EXAMPLES 72 TO 81 AND COMPARATIVE EXAMPLES 59 TO 67

PP's, EVA's, fillers, PE's and rubbers (respective blending amounts and kinds of which are shown in Table 13), as well as modified propylene polymer (1) (referred to as "modified PP(A)") and the ethylene copolymer (III) (copolymer) (III) (the blending amounts of which are shown in Table 13) were mixed for 5 minutes by using a super mixer. Pellets were prepared in the same manner as in Example 1 from each of the mixtures thus obtained, and measurement was conducted of the Izod impact strength and the flexural modulus, as well the room temperature adhesion and the heat resistant adhesion. The results are shown in Table 14.

TABLE 13

| Example No. | PP Kind | PP Blending amount (parts by weight) | EVA Kind | EVA Blending amount (parts by weight) | Blending amount of modified PP(A) (parts by weight) | Copolymer (III) Kind | Copolymer (III) Blending amount (parts by weight) | PE or Rubber Kind | PE or Rubber Blending amount (parts by weight) | Filler Kind | Filler Blending amount (parts by weight) |
|---|---|---|---|---|---|---|---|---|---|---|---|
| 72 | PP(E) | 70 | EVA(a) | 15 | 10 | EAA | 5 | — | 0 | talc | 20 |
| 73 | " | " | " | 0 | " | " | " | — | 0 | mica | " |
| 74 | " | 60 | " | 0 | " | " | " | PE(a) | 10 | talc | " |
| 75 | PP(C) | 65 | " | 10 | " | " | " | EPR | " | " | 30 |
| 76 | " | " | " | " | " | " | " | EPDM | " | " | " |
| 77 | " | 55 | " | 15 | " | " | 10 | PE(c) | " | mica | 20 |
| 78 | PP(D) | 60 | " | 10 | " | " | " | — | 0 | wood powder | " |
| 79 | PP(E) | 65 | " | 20 | " | " | 7.5 | — | 0 | talc | 25 |
| 80 | " | 72.5 | " | 15 | " | ET | 2.5 | — | 0 | " | 20 |
| 81 | " | " | " | 0 | " | " | " | — | 0 | hull | 25 |

| Comparative Example No. | PP Kind | PP Blending amount (parts by weight) | EVA Kind | EVA Blending amount (parts by weight) | Blending amount of modified PP(A) (parts by weight) | Copolymer (III) Kind | Copolymer (III) Blending amount (parts by weight) | PE or Rubber Kind | PE or Rubber Blending amount (parts by weight) | Filler Kind | Filler Blending amount (parts by weight) |
|---|---|---|---|---|---|---|---|---|---|---|---|
| 59 | PP(E) | 100 | — | 0 | 0 | — | 0 | — | 0 | — | 0 |
| 60 | " | 75 | EVA(a) | 20 | 0 | EAA | 5 | — | 0 | — | 0 |
| 61 | " | " | — | 0 | 20 | " | " | — | 0 | talc | 20 |
| 62 | " | 66 | EVA(a) | 15 | 4 | " | " | PE(a) | 10 | " | " |
| 63 | " | " | " | 4 | 15 | " | " | EPR | " | mica | " |
| 64 | " | 50 | " | 35 | 10 | " | " | — | 0 | — | 0 |
| 65 | PP(C) | 60 | EVA(c) | 20 | " | " | 10 | — | 0 | talc | 25 |
| 66 | " | 100 | — | 0 | 0 | — | 0 | — | 0 | wood powder | 15 |
| 67 | PP(D) | 40 | EVA(a) | 15 | 10 | EAA | 10 | EPDM | 25 | — | 0 |

TABLE 14

| Example No. | Peeling strength (kg/25 mm) Room temperature | Peeling strength (kg/25 mm) Heat resistant | Flexural modulus (kg/cm²) | Izod impact strength (with notch) (kg · cm/cm) |
|---|---|---|---|---|
| 72 | Breaking in material | Breaking in material | 18,700 | 6.4 |
| 73 | " | " | 23,100 | 3.8 |
| 74 | " | " | 17,100 | 9.8 |
| 75 | " | " | 18,300 | 15.3 |
| 76 | " | " | 18,700 | 14.8 |
| 77 | " | " | 22,400 | 4.5 |
| 78 | " | " | 14,800 | 2.8 |
| 79 | " | " | 17,500 | 7.6 |
| 80 | " | " | 17,600 | 6.7 |
| 81 | " | " | 16,900 | 3.1 |

| Comparative Example No. | Peeling strength (kg/25 mm) Room temperature | Peeling strength (kg/25 mm) Heat resistant | Flexural modulus (kg/cm²) | Izod impact strength (with notch) (kg · cm/cm) |
|---|---|---|---|---|
| 59 | 1.2 | 0.4 | 15,200 | 6.5 |
| 60 | Breaking in material | 1.4 | 10,300 | 14.6 |
| 61 | 1.9 | 1.2 | 24,200 | 6.3 |
| 62 | Breaking in material | 1.0 | 17,600 | 10.2 |
| 63 | 1.6 | 1.5 | 25,800 | 5.7 |
| 64 | Breaking in material | Breaking in material | 6,900 | 30.5 |
| 65 | 1.7 | 0.8 | 18,400 | 4.1 |
| 66 | 1.3 | 0.6 | 19,700 | 1.8 |
| 67 | Breaking in material | Breaking in material | 6,500 | Not broken |

EXAMPLES 82 TO 95 AND COMPARATIVE EXAMPLES 68 TO 76

PP's, ethylene copolymers (I) (hereinafter referred to as "copolymer (I)"), copolymers (II), PE's, rubbers and fillers (respective blending amounts and kinds of which are shown in Table 15) were mixed for 5 minutes by using a super mixer. Pellets were prepared in the same manner as in Example 1 from each of the mixtures thus obtained, and measurement was conducted of the Izod impact strength and the flexural modulus, as well the room temperature adhesion and the heat resistant adhesion. The results are shown in Table 16.

TABLE 15

| Example No. | PP Kind | PP Blending amount (parts by weight) | Copolymer (I) Kind | Copolymer (I) Blending amount (parts by weight) | Copolymer (II) Kind | Copolymer (II) Blending amount (parts by weight) | PE or Rubber Kind | PE or Rubber Blending amount (parts by weight) | Filler Kind | Filler Blending amount (parts by weight) |
|---|---|---|---|---|---|---|---|---|---|---|
| 82 | PP(E) | 77.5 | EMMA(a) | 15 | Copolymer (1) | 7.5 | — | 0 | — | 0 |
| 83 | " | " | " | " | Copolymer (2) | " | — | 0 | — | 0 |
| 84 | " | " | " | " | " | " | — | 0 | talc | 20 |
| 85 | " | 72.5 | " | 10 | " | " | PE(a) | 10 | " | 30 |
| 86 | " | 75.5 | " | " | " | " | EPR | 7 | " | " |
| 87 | " | " | " | " | " | " | EPDM | " | " | " |
| 88 | PP(C) | 67.5 | EEA | 15 | Copolymer (3) | " | PE(a)[1] | 5 | mica | 25 |
| 89 | " | 70.5 | " | " | " | " | PE(b) | 7 | " | 30 |
| 90 | " | " | " | " | " | " | PE(c) | 7 | " | " |
| 91 | PP(D) | 70 | " | " | Copolymer (2) | 15 | — | 0 | " | " |
| 92 | PP(E) | 74 | EMMA(a) | 20 | " | 6.0 | — | 0 | talc | " |
| 93 | " | 72 | " | 8 | " | 20 | — | 0 | " | " |
| 94 | " | 69.5 | " | " | " | 7.5 | PE(a) | 15 | jute | " |
| 95 | " | 82.5 | " | 10 | " | " | — | 0 | wood powder | 20 |

| Comparative Example No. | PP Kind | PP Blending amount (parts by weight) | Copolymer (I) Kind | Copolymer (I) Blending amount (parts by weight) | Copolymer (II) Kind | Copolymer (II) Blending amount (parts by weight) | PE or Rubber Kind | PE or Rubber Blending amount (parts by weight) | Filler Kind | Filler Blending amount (parts by weight) |
|---|---|---|---|---|---|---|---|---|---|---|
| 68 | PP(E) | 100 | — | 0 | — | 0 | — | 0 | — | 0 |
| 69 | " | 80 | EMMA(a) | 20 | — | 0 | — | 0 | talc | 20 |
| 70 | " | " | — | 0 | Copolymer (2) | 20 | — | 0 | " | 30 |
| 71 | " | 71 | EMMA(a) | 4 | Copolymer (3) | 15 | PE(a) | 10 | " | " |
| 72 | " | 73 | " | 15 | Copolymer (1) | 2 | EPR | " | " | " |
| 73 | " | 45 | EEA | 35 | Copolymer (2) | 10 | " | " | — | 0 |
| 74 | " | 80 | EMMA(a) | 20 | — | 0 | — | 0 | — | 0 |
| 75 | PP(C) | 60 | EMMA(b) | " | Copolymer (1) | 10 | PE(b) | 10 | mica | 30 |
| 76 | PP(D) | 55 | EMMA(a) | 10 | Copolymer (2) | 0 | EPDM | 25 | talc | 20 |

[1] 5 parts by weight of EPR was further blended.

TABLE 16

| Example No. | Peeling strength (kg/25 mm) Room temperature | Peeling strength (kg/25 mm) Heat resistant | Flexural modulus (kg/cm$^2$) | Izod impact strength (with notch) (kg · cm/cm) |
|---|---|---|---|---|
| 82 | Breaking in material | Breaking in material | 9,600 | 14.9 |
| 83 | " | " | 9,100 | 16.2 |
| 84 | " | " | 14,300 | 8.6 |
| 85 | " | " | 17,400 | 13.4 |
| 86 | " | " | 16,500 | 16.8 |
| 87 | " | " | 16,800 | 15.1 |
| 88 | " | " | 23,900 | 5.2 |
| 89 | " | " | 24,500 | 4.3 |
| 90 | " | " | 23,800 | 3.8 |
| 91 | " | " | 17,300 | 4.7 |
| 92 | " | " | 16,200 | 8.5 |
| 93 | " | " | 15,800 | 11.3 |
| 94 | " | " | 19,700 | 15.6 |
| 95 | " | " | 18,600 | 3.5 |

| Comparative Example No. | Peeling strength (kg/25 mm) Room temperature | Peeling strength (kg/25 mm) Heat resistant | Flexural modulus (kg/cm$^2$) | Izod impact strength (with notch) (kg · cm/cm) |
|---|---|---|---|---|
| 68 | 1.2 | 0.4 | 15,200 | 6.5 |
| 69 | Breaking in material | 0.9 | 14,700 | 8.3 |
| 70 | " | 1.5 | 16,100 | 6.7 |
| 71 | 2.0 | 1.3 | 15,200 | 11.8 |
| 72 | Breaking in material | 1.2 | 14,800 | 17.1 |

TABLE 16-continued

| 73 | " | Breaking in material | 6,200 | Not broken |
| 74 | " | 1.1 | 9,700 | 15.3 |
| 75 | 1.2 | 0.7 | 23,400 | 5.6 |
| 76 | Breaking in material | Breaking in material | 7,100 | Not broken |

EXAMPLES 96 TO 107 AND COMPARATIVE EXAMPLES 77 TO 86

PP's, copolymers (I), PE's, ethylene-propylene copolymer (hereinafter referred to as "rubbery copolymer") and fillers (respective blending amounts and kinds of which are shown in Table 17), as well as the modified propylene (1) (referred to as modified PP(A)) and the modified propylene polymer (2) (referred to as modified PP(B)) (the blending amount of which is shown in Table 17) were mixed for five minutes by using a super mixer. Pellets were produced in the same manner as in Example 1 from each of the mixtures thus obtained, and measurement was conducted of the Izod impact strength and the flexural modulus, as well as the room temperature adhesion and the heat resistant adhesion. The results are shown in Table 18.

TABLE 17

| | PP | | Copolymer (I) | | Blending amount of modified PP(A) (parts by weight) | Rubbery copolymer and PE | | Blending amount of modified PP(B) (parts by weight) | Filler | |
|---|---|---|---|---|---|---|---|---|---|---|
| Example No. | Kind | Blending amount (parts by weight) | Kind | Blending amount (parts by weight) | | Kind | Blending amount (parts by weight) | | Kind | Blending amount (parts by weight) |
| 96 | PP(E) | 70 | EVA(b) | 15 | 10 | Rubber(3) | 5 | 0 | — | 0 |
| 97 | " | 65 | " | " | " | Rubber(2) | " | 5 | talc | 20 |
| 98 | PP(C) | " | EVA(a) | " | " | Rubber(1) | 10 | " | " | " |
| 99 | PP(D) | " | " | " | " | Rubber(2) | 5 | " | " | " |
| 100 | PP(E) | 55 | EMMA | 10 | " | " | 15 | 10 | mica | " |
| 101 | " | 58 | EEA | 15 | " | " | 10 | 7 | talc[4] | 15 |
| 102 | " | 55 | EVA(a) | 10 | 20 | " | " | 5 | talc | 30 |
| 103 | " | " | " | " | 15 | Rubber(2)[1] | 5 | " | " | 25 |
| 104 | " | 51 | " | " | " | Rubber(2)[2] | 7 | 10 | mica | 20 |
| 105 | " | " | " | " | " | Rubber(2)[3] | 7 | " | " | " |
| 106 | PP(C) | 58 | " | 20 | 7 | Rubber(2) | 10 | 5 | jute | " |
| 107 | PP(E) | 55 | " | 10 | 15 | " | 5 | " | wood powder | " |

[1]10 parts by weight of PE(a) was further blended.
[2]7 parts by weight of PE(b) was further blended.
[3]7 parts by weight of PE(c) was further blended.
[4]5 parts by weight of mica was further blended.

| | PP | | Copolymer (I) | | Blending amount of modified PP(A) (parts by weight) | Rubbery copolymer and PE | | Blending amount of modified PP(B) (parts by weight) | Filler | |
|---|---|---|---|---|---|---|---|---|---|---|
| Comparative Example No. | Kind | Blending amount (parts by weight) | Kind | Blending amount (parts by weight) | | Kind | Blending amount (parts by weight) | | Kind | Blending amount (parts by weight) |
| 77 | PP(E) | 100 | — | 0 | 0 | — | 0 | 0 | — | 0 |
| 78 | " | 85 | EVA(a) | 15 | 0 | — | 0 | 0 | — | 0 |
| 79 | PP(C) | 75 | " | " | 10 | — | 0 | 0 | talc | 20 |
| 80 | PP(E) | 66 | " | 4 | 15 | Rubber(1) | 10 | 5 | " | " |
| 81 | " | 46 | EEA | 35 | 4 | Rubber(2) | " | " | " | " |
| 82 | " | 65 | — | 0 | 20 | " | " | " | " | " |
| 83 | PP(D) | 40 | EVA(a) | 15 | 10 | " | 30 | " | — | 0 |
| 84 | PP(E) | 65 | EVA(c) | " | " | " | 5 | " | mica | 20 |
| 85 | " | 25 | EMMA | " | " | Rubber(2)[1] | 10 | 10 | talc | " |
| 86 | " | 55 | " | " | " | Rubber(2) | 10 | " | mica | 50 |

[1]30 parts by weight of PE(i) was further blended.

TABLE 18

| | Peeling strength (kg/25 mm) | | Flexural modulus (kg/cm$^2$) | Izod impact strength (with notch) (kg · cm/cm) |
|---|---|---|---|---|
| Example No. | Room temperature | Heat resistant | | |
| 96 | Breaking in material | Breaking in material | 9,800 | 19.4 |
| 97 | " | " | *15,200 | 14.7 |
| 98 | " | " | 15,900 | 8.3 |
| 99 | " | " | 12,700 | 11.5 |
| 100 | " | " | 18,500 | 9.6 |
| 101 | " | " | 15,600 | 13.2 |
| 102 | " | " | 16,800 | 16.3 |
| 103 | " | " | 17,300 | 14.3 |
| 104 | " | " | 20,400 | 6.8 |

TABLE 18-continued

| | | | | |
|---|---|---|---|---|
| 105 | " | " | 19,800 | 7.2 |
| 106 | " | " | 18,100 | 11.9 |
| 107 | " | " | 17,500 | 5.4 |

| Comparative Example No. | Peeling strength (kg/25 mm) | | Flexural modulus (kg/cm$^2$) | Izod impact strength (with notch) (kg·cm/cm) |
|---|---|---|---|---|
| | Room temperature | Heat resistant | | |
| 77 | 1.2 | 0.4 | 15,200 | 6.5 |
| 78 | 2.0 | 0.8 | 9,600 | 15.3 |
| 79 | Breaking in material | Breaking in material | 19,700 | 2.8 |
| 80 | 2.0 | 1.4 | 18,500 | 13.7 |
| 81 | Breaking in material | 1.5 | 8,500 | 30.2 |
| 82 | 1.8 | 1.4 | 20,600 | 15.4 |
| 83 | Breaking in material | Breaking in material | 5,900 | Not broken |
| 84 | 1.9 | 1.1 | 21,300 | 5.1 |
| 85 | 2.1 | 1.3 | 9,100 | 19.2 |
| 86 | 1.6 | 1.1 | 37,400 | 3.6 |

While the invention has been described in detail and with reference to specific embodiments thereof, it will be apparent to one skilled in the art that various changes and modifications can be made therein without departing from the spirit and scope thereof.

What is claimed is:

1. A propylene polymer composition comprising:
   (a) a crystalline propylene polymer having a melt-flow index of from 0.01 to 100 g/10 min.;
   (b) a first ethylene copolymer comprising ethylene and from about 3.0 to 50% by weight of at least one copolymerizable monomer selected from the group consisting of a vinyl ester and an unsaturated carboxylic acid ester; and at least one of
   (c) a first modified propylene polymer produced by reacting 100 parts by weight of a propylene polymer with from about 0.01 to 10 parts by weight of an organic unsaturated compound having at least one hydroxyl group and from about 0.01 to 10 parts by weight of an organic peroxide, or
   (d) a second ethylene copolymer comprising ethylene and at least one copolymerizable ethylenically unsaturated monomer having at least one epoxy group.

2. The propylene polymer composition as claimed in claim 1, wherein said crystalline propylene polymer is selected from the group consisting of a propylene homopolymer and a copolymer of propylene having up to about 30% by weight of at least one of ethylene or a higher α-olefin comonomer.

3. The propylene polymer composition as claimed in claim 1, wherein said first ethylene copolymer comprises from about 4.0 to 45% by weight of said at least one copolymerizable monomer.

4. The propylene polymer composition as claimed in claim 1, wherein said first modified propylene polymer is produced by reacting a propylene polymer selected from the group consisting of a propylene homopolymer, a random or block copolymer or propylene and ethylene, and a random or block copolymer of propylene and a higher α-olefin; with (i) an organic unsaturated compound containing at least one hyroxyl group selected from the group consisting of an alcohol containing a double bond, an alcohol containing a triple bond, an ester of a monobasic unsaturated carboxylic acid with an alcohol, and an ester of a dibasic unsaturated carboxylic acid with an alcohol and (ii) an organic peroxide having a half-decay period of 1 minute at temperatures higher than 100° C.

5. The propylene polymer composition as claimed in claim 1, wherein said second ethylene copolymer comprises an ethylenically unsaturated monomer containing at least one epoxy group represented by formula (II) or (III):

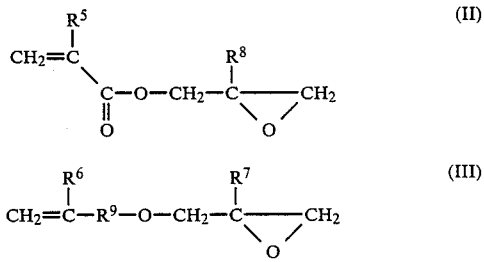

where R$^5$, R$^6$, R$^7$ and R$^8$, which may be the same or different, each represents hydrogen or methyl, and R$^9$ represents a linear or branched alkylene group containing from 1 to 12 carbon atoms.

6. The propylene polymer composition as claimed in claim 2, wherein said crystalline propylene polymer comprises at most about 25% by weight of ethylene and said higher α-olefin comonomer.

7. The propylene polymer composition as claimed in claim 3, wherein said first ethylene copolymer comprises from about 5.0 to 40% by weight of said at least one copolymerizable monomer.

8. The propylene polymer composition as claimed in claim 4, wherein said first modified propylene polymer is produced by reacting 100 parts by weight of said propylene polymer with from about 0.02 to 10 parts by weight of said organic unsaturated compound containing at least one hydroxyl group and from about 0.01 to 7.0 parts by weight of said organic peroxide at a temperature from about 180° to 300° C.

9. The propylene polymer composition as claimed in claim 6, wherein said crystalline propylene polymer comprises at most about 22% by weight of ethylene and said higher α-olefin comonomer.

10. The propylene polymer composition as claimed in claim 2, wherein said higher α-olefin comonomer contains from 4 to 8 carbon atoms.

11. The propylene polymer composition as claimed in claim 10, wherein said higher α-olefin comonomer is selected from the group consisting of butene-1, heptene-1,4-methylpentene-1 and hexene-1.

12. The propylene polymer composition as claimed in claim 1, wherein said crystalline propylene polymer has a melt-flow index of from about 0.01 to 80 g/10 min.; said first ethylene copolymer has a melt-flow index of from about 0.1 to 300 g/10 min.; said propylene polymer reacted to produce said first modified propylene polymer has a melt-flow index of from about 0.01 to 100 g/10 min.; and said second ethylene copolymer has a melt-flow index of from about 0.01 to 1,000 g/10 min.

13. The propylene polymer composition as claimed in claim 12, wherein said crystalline propylene polymer has a melt-flow index of from about 0.05 to 70 g/10 min.; said first ethylene copolymer has a melt-flow index of from about 0.1 to 200 g/10 min.; said propylene polymer reacted to produce said first modified propylene polymer has a melt-flow index of from about 0.01 to 50 g/10 min.; and said second ethylene copolymer has a melt-flow index of from about 0.05 to 500 g/10 min.

14. The propylene polymer composition as claimed in claim 13, wherein said first ethylene copolymer has a melt-flow index of from about 0.5 to 150 g/10 min.; said propylene polymer reacted to produce said first modified propylene polymer has a melt-flow index of from about 0.02 to 50 g/10 min.; and said second ethylene polymer has a melt-flow index of from about 0.1 to 500 g/10 min.

15. The propylene polymer composition as claimed in claim 1, wherein said first ethylene copolymer comprises at least one copolymerizable monomer selected from the group consisting of a vinyl ester containing up to 20 carbon atoms and an unsaturated carboxylic acid ester containing from 4 to 40 carbon atoms.

16. The propylene polymer composition as claimed in claim 15, wherein said vinyl ester contains from 4 to 16 carbon atoms and said unsaturated carboxylic acid ester contains from 4 to 30 carbon atoms.

17. The propylene polymer composition as claimed in claim 16, wherein said unsaturated carboxylic acid ester contains from 4 to 20 carbon atoms.

18. The propylene polymer composition as claimed in claim 16, wherein said vinyl ester is selected from the group consisting of vinyl acetate, vinyl propionate, vinyl butyrate, and vinyl pivalate; and said unsaturated carboxylic acid ester is selected from the group consisting of methyl acrylate, methyl methacrylate, ethyl acrylate, ethyl methacrylate and an alkoxyalkyl acrylate containing an alkoxy group having from 1 to 8 carbon atoms and an alkyl group containing from 1 to 8 carbon atoms.

19. The propylene polymer composition as claimed in claim 18, wherein said vinyl ester is vinyl acetate and said alkoxyalkyl acrylate is selected from the group consisting of methoxyethyl acrylate, ethoxymethyl acrylate and butoxyethyl acrylate.

20. The propylene polymer composition as claimed in claim 4, wherein said alcohol contained in each of said carboxylic acid esters is selected from the group consisting of an unsubstituted dihydric alcohol, an unsubstituted trihydric alcohol, an unsubstituted tetrahydric alcohol and an unsubstituted pentahydric alcohol.

21. The propylene polymer composition as claimed in claim 1, wherein said first modified propylene polymer is produced by reacting 100 parts by weight of said propylene polymer with from about 0.02 to 7.0 parts by weight of said organic unsaturated compound and from about 0.02 to 5.0 parts by weight of said organic peroxide.

22. The propylene polymer composition as claimed in claim 5, wherein said ethylenically unsaturated monomer containing at least one epoxy group is selected from the group consisting of glycidyl methacrylate, glycidyl acrylate, α-methylglycidyl acrylate, α-methylglycidyl methacrylate, vinyl glycidyl ether, allyl glycidyl ether and methacryl glycidyl ether.

23. The propylene polymer composition as claimed in claim 5, wherein said second ethylene copolymer further comprises a third copolymerizable monomer selected from the group consisting of an unsaturated carboxylic acid ester and a vinyl ester.

24. The propylene polymer composition as claimed in claim 23, wherein said unsaturated carboxylic acid ester comprises from 4 to 40 carbon atoms and said vinyl ester comprises up to 20 carbon atoms.

25. The propylene polymer composition as claimed in claim 24, wherein said unsaturated carboxylic acid ester comprises from 4 to 20 carbon atoms and said vinyl ester comprises from 4 to 16 carbon atoms.

26. The propylene polymer composition as claimed in claim 25, wherein said unsaturated carboxylic acid ester is selected from the group consisting of methyl acrylate, methyl methacrylate, ethyl acrylate, ethyl methacrylate and an alkoxy alkylacrylate containing an alkoxy group containing from 1 to 8 carbon atoms and an alkyl group containing from 1 to 8 carbon atoms.

27. The propylene polymer composition as claimed in claim 26, wherein said unsaturated carboxylic acid ester is an alkoxyalkyl acrylate selected from the group consisting of methoxyethyl acrylate, ethoxyethyl acrylate and butoxyethyl acrylate; and said vinyl ester is selected from the group consisting of vinyl acetate, vinyl propionate, vinyl butyrate and vinyl pivalate.

28. The propylene polymer composition as claimed in claim 23, wherein said second ethylene copolymer comprises from about 0.1 to 20% by weight of said ethylenically unsaturated monomer containing at least one epoxy group, and up to about 69.9% by weight of said third copolymerizable monomer selected from the group consisting of an unsaturated carboxylic acid ester and a vinyl ester.

29. The propylene polymer composition as claimed in claim 28, wherein said second ethylene copolymer comprises from about 0.5 to 20% by weight of said ethylenically unsaturated monomer containing at least one epoxy group, and up to about 65% by weight of said third copolymerizable monomer selected from the group consisting of an unsaturated carboxylic acid ester and a vinyl ester.

30. The propylene polymer composition as claimed in claim 29, wherein said second ethylene copolymer comprises from about 0.5 to 15% by weight of said ethylenically unsaturated monomer containing at least one epoxy group and at most about 60% by weight of said third copolymerizable monomer selected from the group consisting of an unsaturated carboxylic acid ester and a vinyl ester.

31. The propylene polymer composition as claimed in claim 1, comprising at least about 40% by weight of said crystalline propylene polymer; from about 5.0 to 30% by weight of said first ethylene copolymer; from about 5.0 to 40% by weight of said first modified propylene polymer; and from about 3.0 to 30% by weight of said second ethylene copolymer.

32. The propylene polymer composition as claimed in claim 31, comprising at least about 45% by weight of said crystalline propylene polymer; from about 5.0 to 25% by weight of said first ethylene copolymer; from about 5.0 to 35% by weight of said first modified propylene polymer; and from about 3.0 to 25% by weight of said second ethylene copolymer.

33. The propylene polymer composition as claimed in claim 32, comprising at least about 50% by weight of said crystalline propylene polymer; from about 6.0 to 25% by weight of said first ethylene copolymer; from about 5.0 to 30% by weight of said first modified propylene polymer; and from about 5.0 to 25% by weight of said second ethylene copolymer.

34. The propylene polymer composition as claimed in claim 1, further comprising (e) from about 0.1 to 40% by weight of a filler per 100 parts by weight of the total of said crystalline polymer, said first ethylene copolymer, said first modified propylene polymer, and said second ethylene copolymer.

35. The propylene polymer composition as claimed in claim 34, further comprising (f) from about 10 to 100 parts of a second modified propylene per 100 parts of said filler, said second modified propylene being one obtained by treating a propylene polymer with at least one of an $\alpha,\beta$-unsaturated carboxylic acid or an anhydride thereof and an organic peroxide and (g) from about 10 to 100 parts by weight of a third ethylene copolymer per 100 parts by weight of said filler, said third ethylene copolymer being a copolymer of ethylene and at least one monomer selected from the group consisting of an $\alpha,\beta$-unsaturated monocarboxylic acid, an $\alpha,\beta$-unsaturated dicarboxylic acid and an anhydride thereof.

36. The propylene polymer composition as claimed in claim 31, further comprising from about 2.0 to 20% by weight of at least one of (h) an ethylene-propylene rubber or (j) an ethylene-propylene copolymer having a degree of crystallinity of at least about 3%.

37. The propylene polymer composition as claimed in claim 26, further comprising from about 0.5 to 20% by weight of an ethylene polymer (k), said ethylene copolymer (k) being selected from the group consisting of an ethylene homopolymer, a random copolymer of ethylene and an $\alpha$-olefin, and a block copolymer of ethylene and an $\alpha$-olefin.

38. The propylene polymer composition as claimed in claim 37, further comprising (e) from about 0.1 40% by weight of a filler per 100 parts by weight of the total of said crystalline polymer, said first ethylene copolymer, said first modified propylene polymer, said second ethylene copolymer, said ethylene-propylene rubber and said ethylene-propylene copolymer.

39. The propylene polymer composition as claimed in claim 1, wherein said first modified propylene polymer is produced by reacting the propylene polymer with the organic unsaturated compound having at least one hydroxy group, the organic peroxide and further an organotin compound.

* * * * *